(12) United States Patent
Andreev et al.

(10) Patent No.: US 6,941,314 B2
(45) Date of Patent: Sep. 6, 2005

(54) USER SELECTABLE EDITING PROTOCOL FOR FAST FLEXIBLE SEARCH ENGINE

(75) Inventors: Alexander E. Andreev, San Jose, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 589 days.

(21) Appl. No.: 10/123,295

(22) Filed: Apr. 15, 2002

(65) Prior Publication Data

US 2003/0208495 A1 Nov. 6, 2003

(51) Int. Cl.⁷ ............................................. G06F 17/30
(52) U.S. Cl. ............................. 707/101; 707/7; 707/102
(58) Field of Search ............................ 707/7, 101, 102, 707/104.1; 711/170–172

(56) References Cited

U.S. PATENT DOCUMENTS

| | | | | |
|---|---|---|---|---|
| 5,511,213 A | * | 4/1996 | Correa | 704/9 |
| 5,924,091 A | * | 7/1999 | Burkhard | 707/7 |
| 5,926,815 A | * | 7/1999 | James, III | 707/7 |
| 6,047,283 A | * | 4/2000 | Braun | 707/3 |
| 6,321,230 B1 | * | 11/2001 | Joslin et al. | 707/100 |
| 6,415,279 B1 | * | 7/2002 | Gard et al. | 707/2 |
| 6,480,839 B1 | * | 11/2002 | Whittington et al. | 707/3 |
| 6,694,323 B2 | * | 2/2004 | Bumbulis | 707/101 |
| 2003/0061227 A1 | * | 3/2003 | Baskins et al. | 707/101 |

OTHER PUBLICATIONS

U.S. Appl. No. 09/822,969, filed Mar. 30, 2001, Andreev et al.
U.S. Appl. No. 09/679,209, filed Oct. 4, 2000, Andreev et al.
U.S. Appl. No. 09/679,313, filed Oct. 4, 2000, Andreev et al.

\* cited by examiner

*Primary Examiner*—Leslie Wong
(74) *Attorney, Agent, or Firm*—Fitch, Even, Tabin & Flannery

(57) ABSTRACT

A method of editing a sorted tree data structure includes selecting a minimum number of entries and a maximum number of entries in each vertex of the sorted tree data structure. If inserting an entry into a bottom vertex of the sorted tree data structure exceeds the maximum number of entries in the bottom vertex, then the entries are redistributed in the sorted tree data structure or a new bottom vertex is created so that no bottom vertex has more than the maximum number of entries and no fewer than the minimum number of entries. If deleting an entry from the bottom vertex results in fewer than the minimum number of entries, then the entries are redistributed in the sorted tree data structure or the bottom vertex is deleted so that no bottom vertex has fewer than the minimum number of entries and no bottom vertex has more than the maximum number of entries.

6 Claims, 17 Drawing Sheets

USER SELECTABLE EDITING PROTOCOL FOR FAST FLEXIBLE SEARCH ENGINE

CROSS-REFERENCE TO RELATED APPLICATIONS

U.S. patent application Ser. No. 09/822,969, filed Mar. 30, 2001, in the name of Andreev et al., entitled "EDITING PROTOCOL FOR FLEXIBLE SEARCH ENGINES", issued on May 11, 2004 with U.S. Pat. No. 6,735,600.

U.S. patent application Ser. No. 09/679,209, filed Oct. 4, 2000, in the name of Andreev et al., entitled "FAST FLEXIBLE SEARCH ENGINE FOR LONGEST PREFIX MATCH", issued on May 13, 2003 with U.S. Pat. No. 6,564,211.

U.S. patent application Ser. No. 09/679,313, filed Oct. 4, 2000, in the name of Andreev et al., entitled "FLEXIBLE SEARCH ENGINE HAVING SORTED BINARY SEARCH TREE FOR PERFECT MATCH", issued on Apr. 22, 2003 with U.S. Pat. No. 6,553,370.

BACKGROUND OF THE INVENTION

The present invention relates generally to search engines for searching large tables of data. More specifically, but without limitation thereto, the present invention relates to an improved method for inserting and deleting entries in a sorted binary tree data structure.

Search engines are a major source of bottlenecks in high performance compilers and routers used for designing integrated circuits and for looking up Internet addresses in network applications. These search engines generally include large tables and databases that require a correspondingly large amount of memory and hardware to perform the search functions and to maintain the search table by adding and deleting entries.

SUMMARY OF THE INVENTION

In one aspect of the present invention, a method of changing a number of entries in a sorted binary tree includes:

selecting a protocol parameter P for determining a tradeoff between memory utilization and required execution time wherein P is an integer greater than zero;

defining a minimum number of entries and a maximum number of entries in each vertex of the sorted binary tree as a function of the protocol parameter P;

if inserting an entry into a bottom vertex of the sorted binary tree exceeds the maximum number of entries in the bottom vertex, and if another bottom vertex has fewer than the maximum number of entries, then redistributing entries in the sorted binary tree until no bottom vertex has more than the maximum number of entries and no fewer than the minimum number of entries;

if inserting an entry into the bottom vertex exceeds the maximum number of entries, and if no bottom vertex has fewer than the maximum number of entries, then creating a new bottom vertex in the sorted binary tree and redistributing entries in the sorted binary tree until no bottom vertex has more than the maximum number of entries or fewer than the minimum number of entries;

if deleting an entry from the bottom vertex results in fewer than the minimum number of entries, and if another bottom vertex has more than the minimum number of entries, then redistributing entries in the sorted binary tree until no bottom vertex has fewer than the minimum number of entries and no more than the maximum number of entries; and if deleting an entry from the bottom vertex results in fewer than the minimum number of entries, and if no bottom vertex has more than the minimum number of entries, then redistributing the entries in the sorted binary tree until the bottom vertex has no entries and deleting the bottom vertex so that every remaining bottom vertex in the sorted binary tree has no fewer than the minimum number of entries and no more than the maximum number of entries.

In another aspect of the present invention, a computer program product for changing a number of entries in a sorted binary tree includes a medium for embodying a computer program for input to a computer; and a computer program embodied in the medium for causing the computer to perform the following functions:

selecting a protocol parameter P for determining a tradeoff between memory utilization and required execution time wherein P is an integer greater than zero;

defining a minimum number of entries and a maximum number of entries in each vertex of the sorted binary tree as a function of the protocol parameter P;

if inserting an entry into a bottom vertex of the sorted binary tree exceeds the maximum number of entries, and if another bottom vertex has fewer than the maximum number of entries, then redistributing entries in the sorted binary tree until no bottom vertex has more than the maximum number of entries and no fewer than the minimum number of entries;

if inserting an entry into the bottom vertex exceeds the maximum number of entries, and if no bottom vertex has fewer than the maximum number of entries, then creating a new bottom vertex in the sorted binary tree and redistributing entries in the sorted binary tree until no bottom vertex has more than the maximum number of entries or fewer than the minimum number of entries;

if deleting an entry from the bottom vertex results in fewer than the minimum number of entries, and if another bottom vertex has more than the minimum number of entries, then redistributing entries in the sorted binary tree until no bottom vertex has fewer than the minimum number of entries and no more than the maximum number of entries; and if deleting an entry from the bottom vertex results in fewer than the minimum number of entries, and if no bottom vertex has more than the minimum number of entries, then redistributing the entries in the sorted binary tree until the bottom vertex has no entries and deleting the bottom vertex so that every remaining bottom vertex in the sorted binary tree has no fewer than the minimum number of entries and no more than the maximum number of entries.

DESCRIPTION OF THE SEVERAL VIEWS OF THE DRAWINGS

The present invention is illustrated by way of example and not limitation in the accompanying figures, in which like references indicate similar elements throughout the several views of the drawings, and in which.

Elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF THE ILLUSTRATED EMBODIMENTS

Lookup procedures are a major source of bottlenecks in high performance compilers and routers used to search databases for applications such as designing integrated circuits and looking up Internet addresses. Recently, there has been renewed interest in binary search trees, largely because all search paths in a sorted binary tree have equal length.

Figure 1:
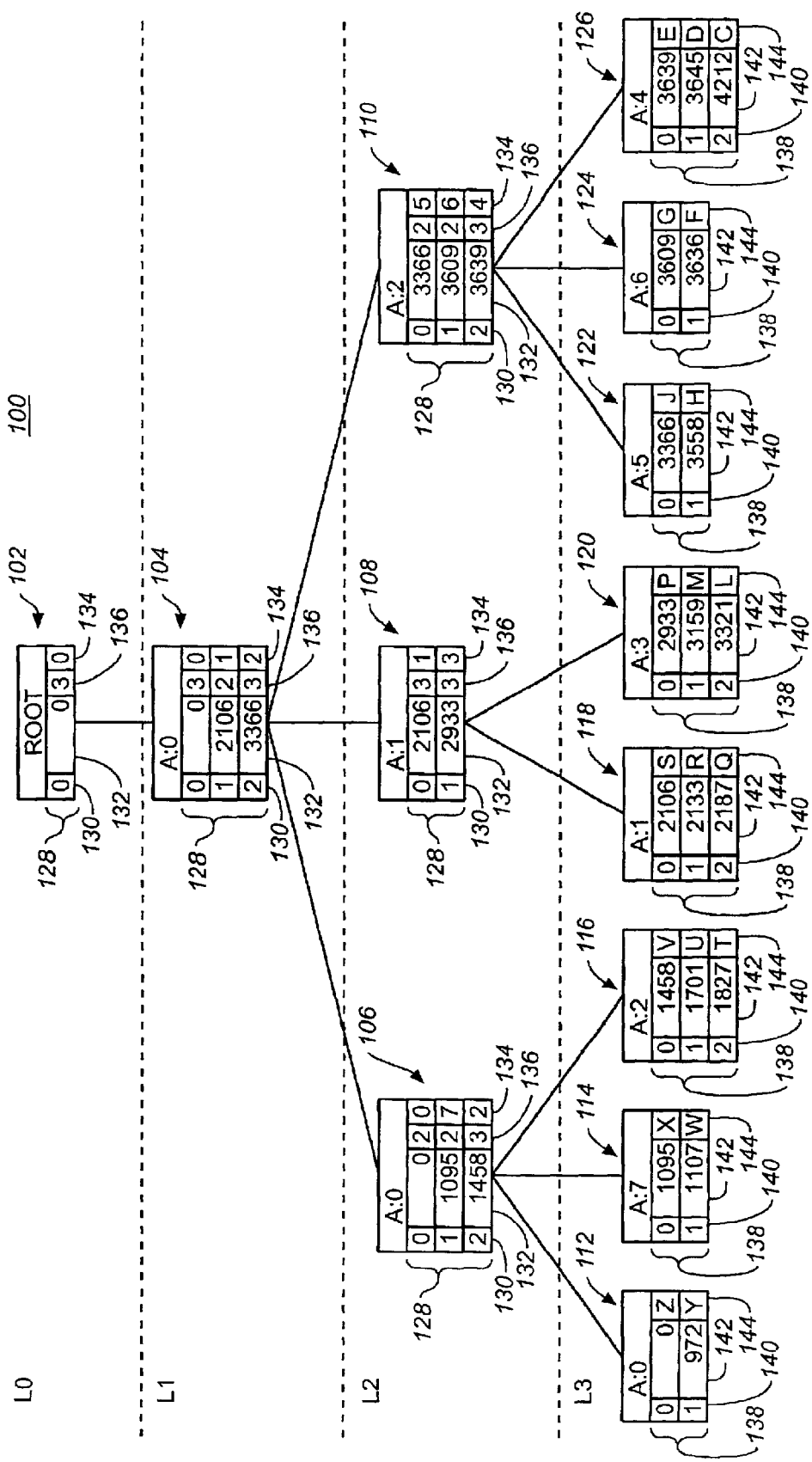
FIG. 1 illustrates a diagram of a sorted binary tree in accordance with an embodiment of the present invention.

FIG. 1 illustrates a diagram of a sorted binary tree 100 in accordance with an embodiment of the present invention. Shown in FIG. 1 are a root vertex or node 102, hierarchy vertices 104, 106, 108, 110, and bottom level vertices or leaves 112, 114, 116, 118, 120, 122, 124, and 126. The specific arrangement and numeric values used for the sorted binary tree 100 are only for purposes of illustration, and the present invention may be practiced with other arrangements and numeric values of the sorted binary tree according to the rules set forth below.

The root vertex or node 102 is the entry point for the sorted binary tree 100 and is assigned a level L0 in the level hierarchy. The next level, L1, contains the hierarchy vertex 104. The next level, L2, contains the hierarchy vertices 106, 108, and 110. The last level, L3, contains the bottom level vertices or leaves 112, 114, 116, 118, 120, 122, 124, and 126. While the sorted binary tree 100 illustrated in FIG. 1 contains four levels, the number of levels may be varied to suit specific applications in various embodiments of the present invention. Increasing the number of levels increases the number of vertices in each search path from the root vertex or node 102 and also the number of the bottom level vertices or leaves 112, 114, 116, 118, 120, 122, 124, and 126, thereby increasing the capacity of the search that may be performed on the sorted binary tree and the corresponding execution time required to perform the search. The execution time required to perform the search is substantially the same for all searches, because each search requires selecting one vertex at every level in the hierarchy of the sorted binary tree 100.

In general, the one or more vertices in level L3 are "child" vertices to the one or more "parent" vertices in level L2, and the one or more vertices in level L2 in turn are child vertices to the single parent vertex in level L1. The root vertex 102 is the entry point for performing searches on the sorted binary tree.

Each of the hierarchy vertices 106, 108, and 110 includes a plurality of entries 128. The root vertex 102 has a single entry 128. Each entry 128 includes an entry address 130, a key address 132, a child vertex address 134, and a child vertex index 136.

The entry address 130 indicates the memory location of the child vertex that includes the corresponding key address 132. For example, the entry address 130 "0" in the root vertex 102 indicates the memory location of the hierarchy vertex 104. In this example, the entry addresses 130 in the hierarchy vertex 104 are "0", "1", and "2", corresponding to the memory locations of the child vertices that include the key addresses 132 "0", "2106", and "3366", respectively.

The key address 132 is identical to the lowest or minimum-ordered key address in a child vertex of the current vertex, that is, a vertex that is one level number higher than that of the current vertex. For example, the key address 132 "2106 " in the parent vertex 104 in level L1 is identical to the lowest key address 132 in the child vertex 108 in level L2.

The child vertex address 134 indicates the memory location of the child vertex containing the corresponding key address 132. For example, the child vertex address 134 corresponding to the key address 132 "2106" in the vertex 104 is "1", which indicates the memory location "A:1" of the child vertex 118.

The child vertex index 136 indicates the number of entries 128 in the child vertex at the corresponding child vertex address 134. For example, the value "2" of the child vertex index 136 corresponding to the key address 132 "2106" in the vertex 104 indicates that the child vertex 108 contains two entries 128.

Each of the bottom level vertices or leaves 112, 114, 116, 118, 120, 122, 124, and 126 includes a plurality of entries 138. Each of the entries 138 includes an entry address 140, a key address 142, and a data field 144. The entry address 140 and the key address 142 are similar to the entry address 130 and the key address 132 in the hierarchy vertices 106, 108, and 110 described above. The data field 144 contains the data associated with the key address 142. For example, the entry 138 in the bottom vertex 112 that includes the key address 142 "972" has a corresponding value of "Y" in the data field 144.

In accordance with the present invention, the number of entries in any hierarchy or bottom vertex is at least k and at most 2k−1, where k is any integer greater than one. In this example, k is equal to two, however, greater values of k may be used in various embodiments of the present invention to suit specific applications. For example, if k is equal to three, then the number of entries in any hierarchy or bottom vertex must be at least three and at most five. Also, while the value of k must be the same for all vertices in the same level, the value of k may differ from one level to the next.

The key addresses 142 are shown in ascending order from left to right in the arrangement of FIG. 1, therefore the value "0" appears in the bottom vertex 112 and the value "4212" appears in the bottom vertex 126. However, the addresses corresponding to the memory locations of the vertices need not be in any specific order. In this example, the addresses of the bottom level vertices 112, 114, 116, 118, 120, 122, 124, and 126 from left to right are "0", "7", "2", "1", "3", "5", "6", and "4", respectively. The only condition on the key addresses is that they be in ascending order through each vertex.

Each key address 142 is associated with a corresponding data field 144, so that a search for a selected key will result in retrieving the data in the corresponding data field 144, provided that the selected key exists in the sorted binary tree 100. The sorted binary tree 100 may be implemented, for example, as a data structure in a computer memory according to well known programming techniques.

Figure 2:
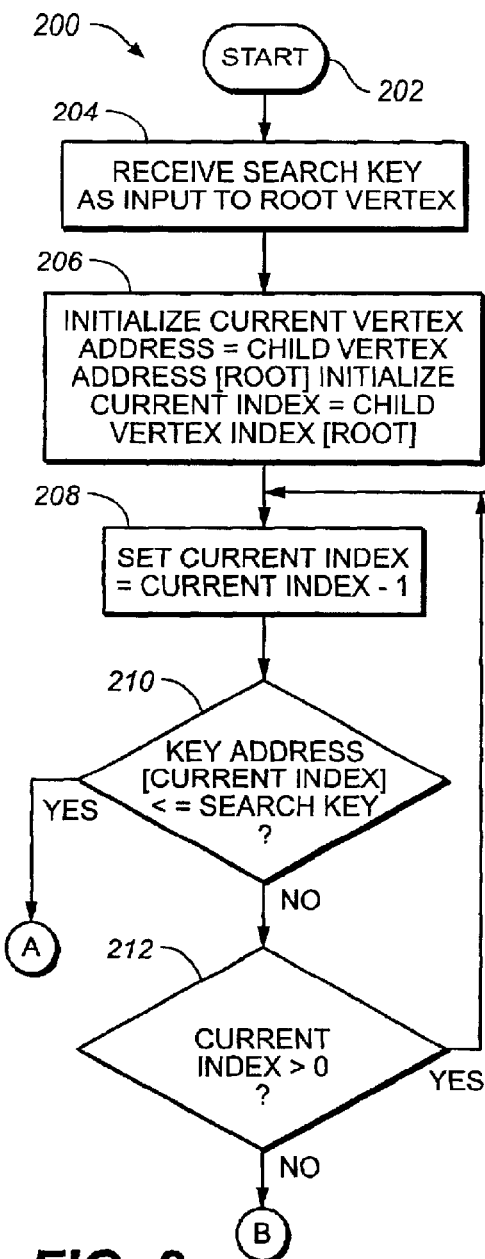
FIGS. 2, 3, and 4 illustrate a flow chart of a method for performing a search function on the sorted binary tree of FIG. 1 in accordance with an embodiment of the present invention.
Figure 3:
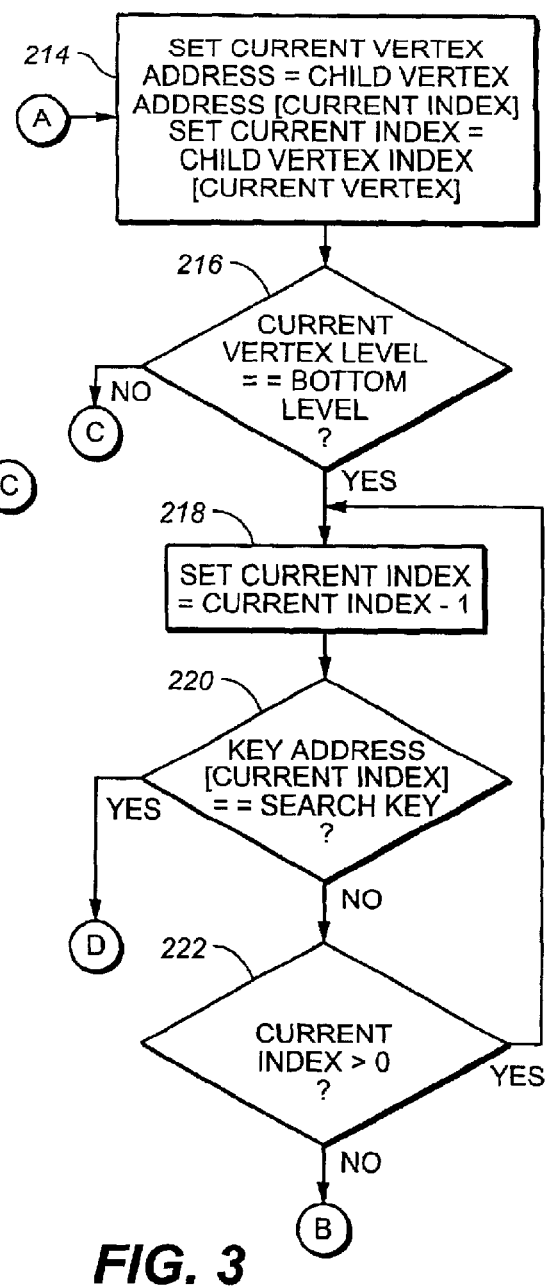
Figure 4:
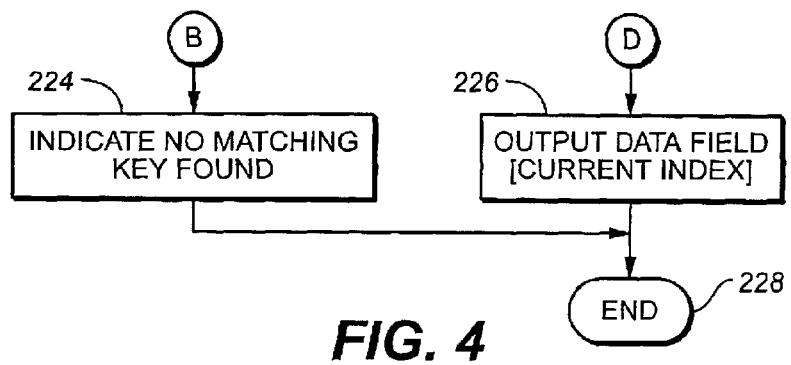

FIGS. 2, 3, and 4 illustrate a flow chart 200 of a fast method for performing a search function on the sorted binary tree 100 of FIG. 1.

Step 202 is the entry point of the flow chart 200.

In step 204, the search key is received as input by the root vertex for initiating a search function.

In step 206, the current vertex address is initialized to the child vertex address from the root vertex entry (current vertex address=child vertex address [0] of the root vertex); and the current index is initialized to the child vertex index from the root vertex entry (current index=child vertex index [0] of the root vertex). The current vertex address is the memory location of the child vertex, and the current index initially indicates the number of entries in the child vertex. The vertex level is initially the L1 level.

In step 208, the current index is decremented by one (current index=current index−1) to point to the next key address in the child vertex.

In step 210, if the key address in the child vertex corresponding to the current index is less than or equal to the search key (key address [current index]<=search key), then control is transferred to step 214. Otherwise, control is transferred to step 212.

In step 212, if the current index is greater than zero (current index>0), then control is transferred to step 208. Otherwise, control is transferred to step 224.

In step 214, the current vertex address is set equal to the child vertex address corresponding to the current index (current vertex address=child vertex address [current index]); and the current index is set equal to the child vertex index corresponding to the current index (current index=child vertex index [current index]). The vertex level of the current vertex address is thereby advanced toward the bottom level.

In step 216, if the current vertex level is equal to the bottom level, then control is transferred to step 218. Otherwise, control is transferred to step 208.

In step 218, the current index is decremented by one (current index=current index−1)to point to the next key address in the child vertex.

In step 220, if the key address corresponding to the current index is equal to the search key (key address [current index]==search key), then control is transferred to step 226. Otherwise, control is transferred to step 222.

In step 222, if the current index is greater than zero (current index>0), then control is transferred to step 218. Otherwise, control is transferred to step 224.

In step 224, an indication that no matching search key was found is generated as output, and control is transferred to 228.

In step 226, a matching search key has been found, and the data field corresponding to the current index (data field [current index]) is generated as output.

Step 228 is the exit point of the flow chart 200.

For example, a search for the key "2133" in the sorted binary tree 100 of FIG. 1 using the flow chart 200 would proceed as follows:

Step 202: Enter.

Step 204: Receive the search key "2133" as input at the root vertex.

Step 206: Initialize the current vertex address to "0" in level L1 and the current index to 3.

Step 208: Current index=3−1=2.

Step 210: Key address [2]="3366">"2133", so control is transferred to step 208.

Step 208: Current index=2−1=1.

Step 210: Key address [1]="2106"<"2133", so control is transferred to step 214.

Step 214: Current vertex address=child vertex address [1]="1" in level L2; current index=child vertex index [1]=2.

Step 216: The current level L2 is not equal to the bottom level L3, so control is transferred to step 208.

Step 208: Current index=2−1=1.

Step 210: Key address [1]="2933">"2133", so control is transferred to step 212.

Step 212: Current index=1>=0, so control is transferred to step 208.

Step 208: Current index=1−1=0.

Step 210: Key address [0]="2106"<"2133", so control is transferred to step 214.

Step 214: Current vertex address=child vertex address [0]="1" in level L3; current index=child vertex index [0]=3.

Step 216: The current level L3 is equal to the bottom level L3, so control is transferred to step 218.

Step 218: Current index−1=3−1=2.

Step 220: Key address [2] is not equal to "2133", so control is transferred to step 222.

Step 222: Current index=2>=0, so control is transferred to step 218.

Step 218: Current index=2−1=1.

Step 220: Key address [1] is equal to "2133", so control is transferred to step 226.

Step 226: Data field [1] ("R") corresponding to matching search key "2133" is generated as output.

Step 228: Exit.

In this example, the search key "2133" was found in the sorted binary tree 100 of FIG. 1, and the corresponding data field "R" was generated as output. The method illustrated by the flow chart 200 in FIG. 2 may similarly be used with other search keys and other sorted binary trees to suit specific applications. Also, the ordering of the entries in the vertices and the signs of the inequalities illustrated in the example may be reversed according to well known techniques to generate equivalent embodiments of the present invention.

The search function illustrated by the flow chart 200 of FIG. 2 may be embodied in a computer program product and implemented by instructions for a computer according to well known programming techniques to perform the following functions:

(a) receiving a search key as input by the root vertex for initiating a search function;

(b) initializing a current vertex address to a child vertex address from the root vertex;

(c) initializing a current index to a child vertex index from the root vertex;

(d) modifying the current index to point to the next key address in the child vertex;

(e) if the next key address in the child vertex corresponding to the current index is less than or equal to the search key, then transferring control to (g); otherwise transferring control to (f);

(f) if the current index indicates a remaining key address in the child vertex, then transferring control to (d); otherwise transferring control to (m);

(g) setting the current vertex address equal to the child vertex address corresponding to the current index, thereby advancing the vertex level of the current vertex address toward the bottom level;

(h) setting the current index equal to the child vertex index corresponding to the current index;

(i) if the vertex level of the current vertex address is equal to the bottom level, then transferring control to (j); otherwise transferring control to (d);

(j) modifying the current index to point to the next key address in the child vertex indicated by the current vertex address;

(k) if the next key address is equal to the search key, then transferring control to (n); otherwise transferring control to (l);

(l) if the current index indicates a remaining key address in the child vertex indicated by the current vertex address, then transferring control to (j); otherwise, transferring control to (m);

(m) generating as output an indication that no matching search key was found and transferring control to (o);

(n) generating as output a data field in the child vertex indicated by the current vertex address corresponding to the search key; and (o) terminating the search function.

When a key address is inserted into or deleted from a bottom vertex, the structure of the sorted binary tree may have to be adjusted. To maintain equal path lengths in the sorted binary tree 100, the vertices are selectively split and merged as illustrated in the following examples.

Figure 5:
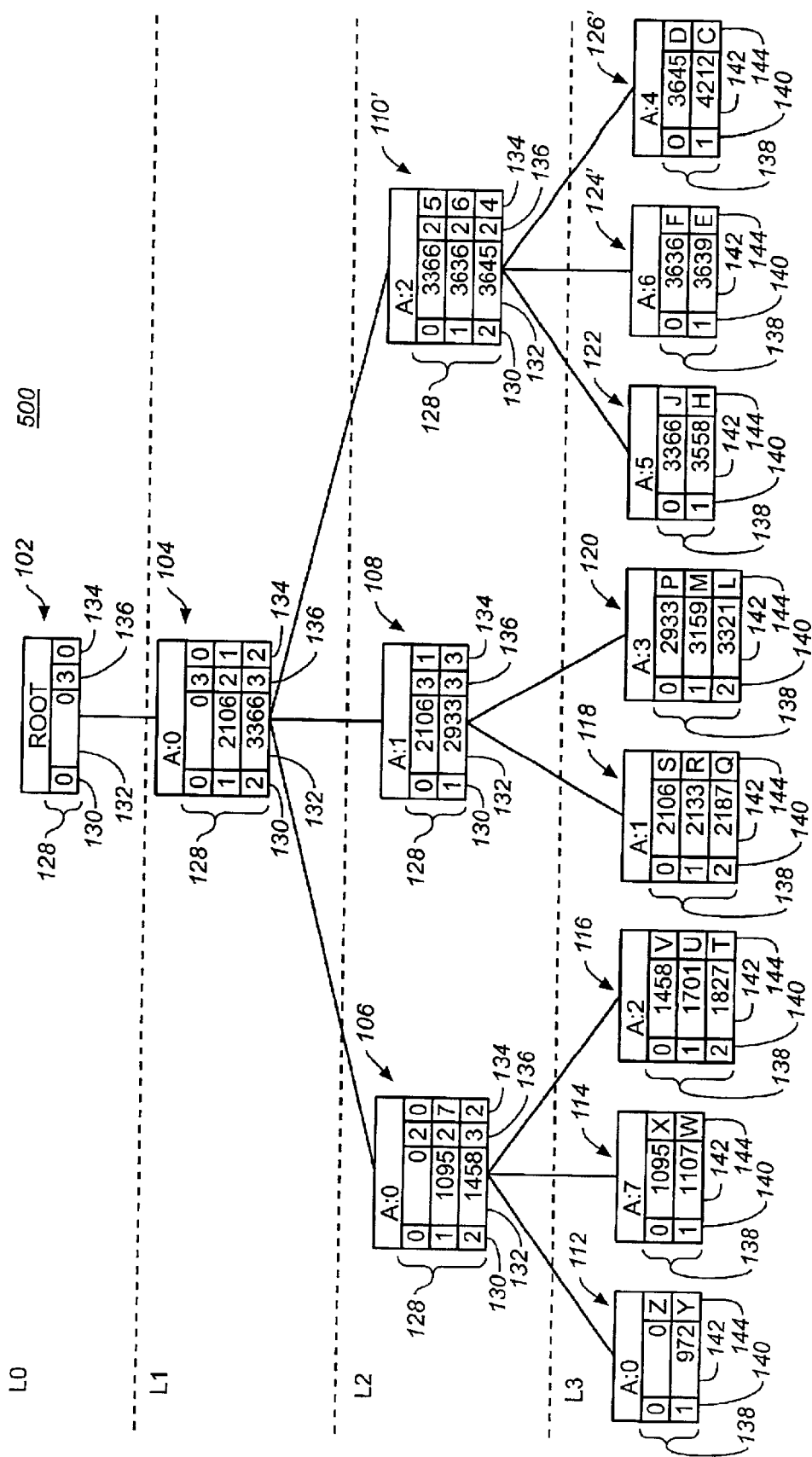
FIG. 5 illustrates an example of deleting an entry from the sorted binary tree of FIG. 1 in accordance with an embodiment of the present invention that results in transferring an entry from an adjacent bottom vertex to the bottom of the bottom vertex in which the entry was deleted.

FIG. 5 illustrates an example of deleting an entry from the sorted binary tree of FIG. 1 that results in transferring an entry 138 from an adjacent bottom vertex to the bottom of the bottom vertex in which the entry 138 was deleted. In this example, the entry 138 including the key address 142 having the value "3609" and the corresponding data field 144 having the value "G" are deleted from the bottom vertex 124, and the entry address 140 of the next entry 138 corresponding to the key address 142 having the value "3636" is changed to "0". After the deletion, however, the bottom vertex 124 is left with only one entry 138, which violates the rule that every vertex in the same vertex level must have at least k entries (k equals two in this example). To avoid the rule violation, the entry 138 including the key address 142 having the value "3639" and the corresponding data field 144 having the value "E" is transferred from the bottom vertex 126 to the bottom vertex 124, resulting in the modified bottom vertices 124' and 126' in FIG. 5. The entries 128 in the parent vertex 110 are accordingly adjusted to associate the key address 132 having the value "3636" with entry address 130 having the value "1", and the key address 132 having the value "3645" is associated with entry address 130 having the value "2". Additionally, the child vertex index 136 containing the number of entries for the bottom vertex 126' is adjusted to two in the parent vertex 110', resulting in the sorted binary tree 500.

Figure 6:
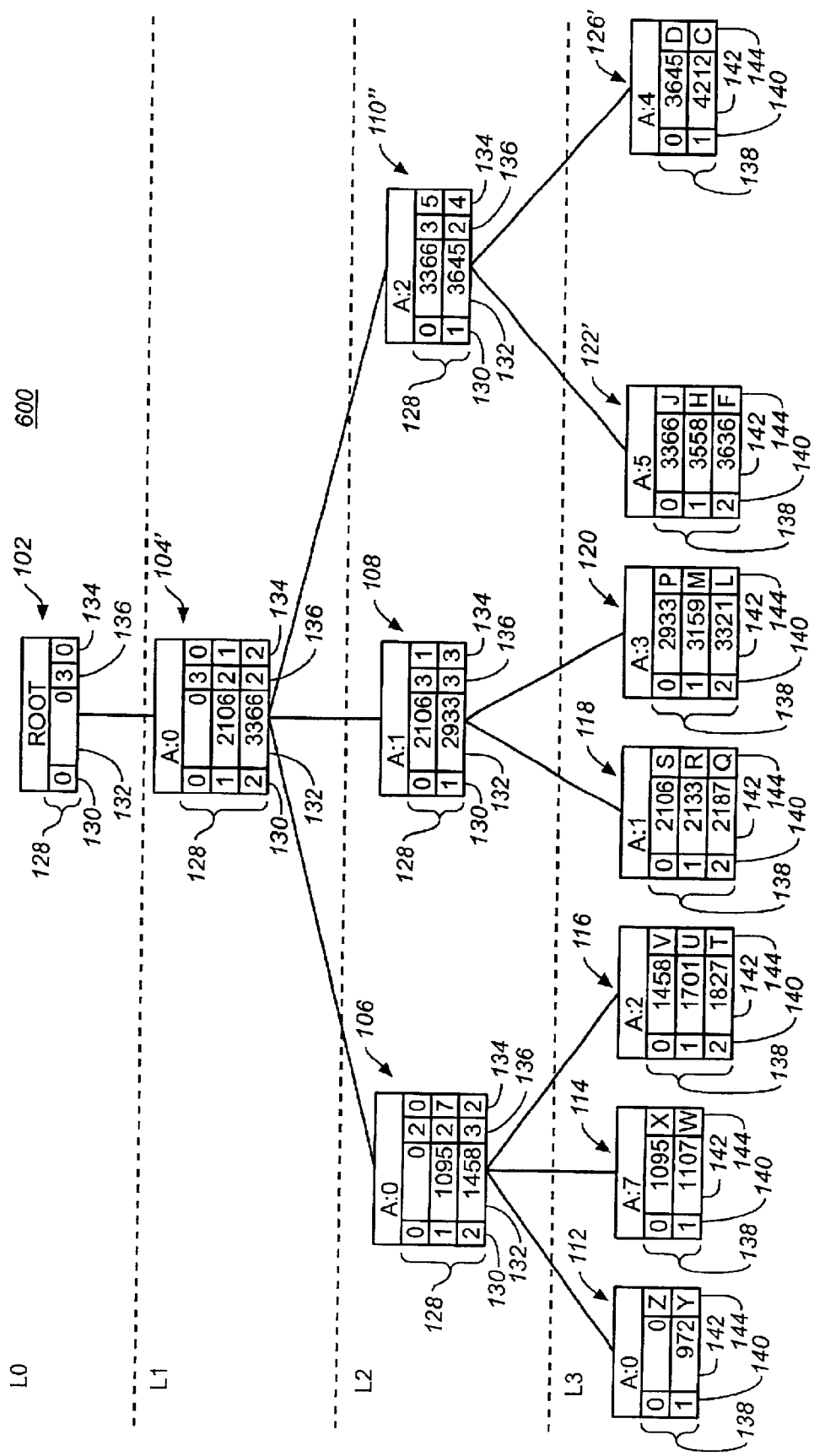
FIG. 6 illustrates an example of deleting an entry from the sorted binary tree of FIG. 5 in accordance with an embodiment of the present invention that results in the deletion of the bottom vertex in which the entry was deleted.

FIG. 6 illustrates an example of deleting an entry from the sorted binary tree 500 of FIG. 5 that results in the deletion of the bottom vertex in which the entry was deleted. In this example, the entry including the key address 142 having the value "3639" and the corresponding data field 144 having the value "E" are deleted from the bottom vertex 124. After the deletion, however, the bottom vertex 124 is left with only one entry 138, again violating the rule that every vertex in the same vertex level must have at least k entries. Since the adjacent bottom vertex 126 now has only has two entries 138, no entry is available to add to the bottom vertex 124. To avoid the rule violation in this case, the entry 138 including the key address 142 having the value "3636" and the corresponding data field 144 having the value "F" is transferred from the bottom vertex 124 and merged into the bottom vertex 122', leaving the bottom vertex 124 empty. The bottom vertex 124 is then deleted. The entries 128 in the parent vertex 110' are accordingly adjusted to indicate the key address 132 having the value "3645" at entry address "1" and no entry for the bottom vertex 124. Additionally, the child vertex index 136 containing the number of entries for the bottom vertex 122' is adjusted to three in the parent vertex 110", and the number of entries for the parent vertex 110" is adjusted to two in the hierarchy vertex 104', resulting in the sorted binary tree 600.

Figure 7:
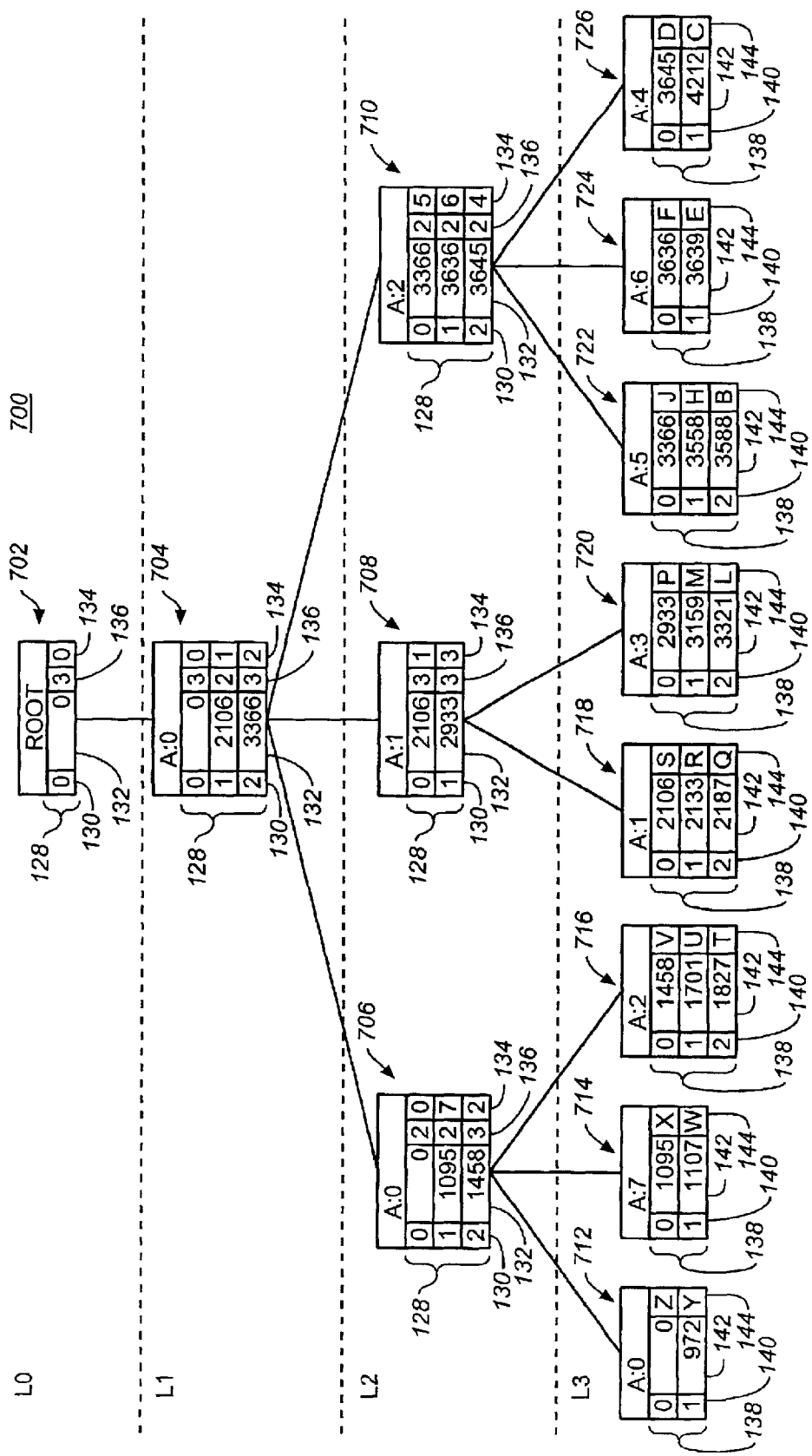
FIG. 7 illustrates an example of deleting an entry from a sorted binary tree in accordance with an embodiment of the present invention that results in transferring a vertex from an adjacent bottom vertex to the top of the bottom vertex in which the entry was deleted.
Figure 8:
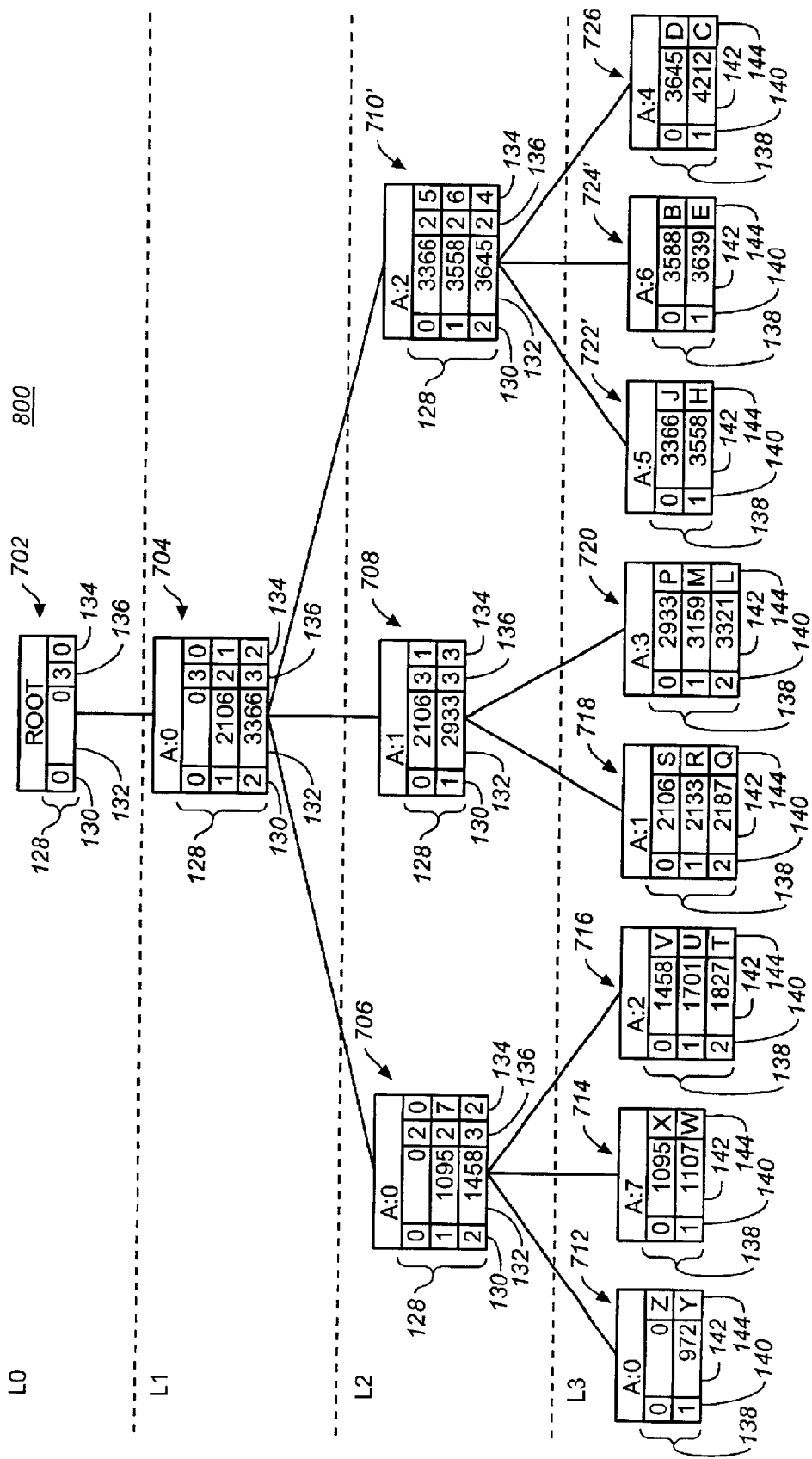
FIG. 8 illustrates the sorted binary tree resulting from deleting the entry from the sorted binary tree of FIG. 7.

FIGS. 7 and 8 illustrate an example of deleting an entry from a sorted binary tree 700 in accordance with the present invention that results in transferring a vertex from an adjacent bottom vertex to the top of the bottom vertex in which the entry was deleted. Shown in FIG. 7 are a root vertex or node 702, hierarchy vertices 704, 706, 708, 710, and bottom level vertices or leaves 712, 714, 716, 718, 720, 722, 724, and 726.

In this example, the initial condition of the sorted binary tree 700 is shown with the entry including the key address 142 having the value "3639" and the corresponding data field 144 having the value "E" to be deleted from the bottom vertex 124. After deleting the entry 138 corresponding to the key address 142 having the value "3639" and the corresponding data field 144 having the value "E", the entry address 140 for the key address 142 having the value "3636" is changed from "0" to "1". Also, the entry 138 corresponding to the key address 142 having the value "3588" and the corresponding data field 144 having the value "B" is transferred from the bottom of the bottom vertex 122 and inserted at the top of the bottom vertex 724 corresponding to the entry address "0", resulting in the modified bottom vertices 722' and 724' in FIG. 8. Additionally, the number of entries for the bottom vertex 722' is adjusted to two in the parent vertex 710', and the key address "3636" is replaced by "3588" at the entry address "1" in the parent vertex 710', resulting in the sorted binary tree 800 in FIG. 8.

Figure 9:
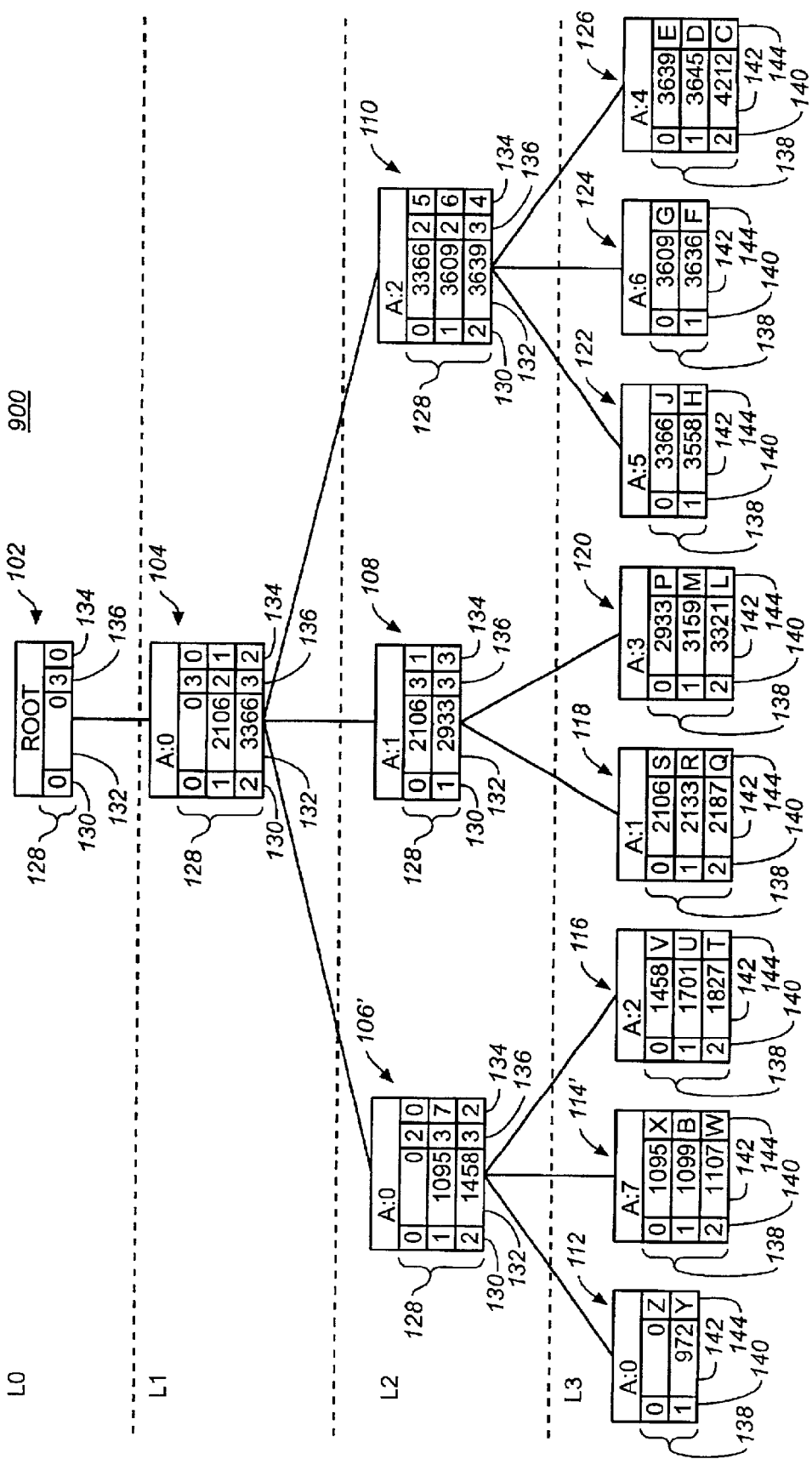
FIG. 9 illustrates an example of inserting an entry into the sorted binary tree 100 of FIG. 1 in accordance with an embodiment of the present invention.

FIG. 9 illustrates an example of inserting an entry 138 into the sorted binary tree 100 of FIG. 1 in accordance with an embodiment of the present invention. In this example, a search for the key address 142 having the value "1099" corresponding to the entry 138 to be inserted is performed as described above. If the search is successful, the value "B" corresponding to the entry 138 is inserted into the corresponding data field 144 for the key address "1099". If the key address 142 having the value "1099" is not found, as in this example, an entry for the key address 138 is inserted as follows. If the bottom vertex in which the entry would have been found (the bottom vertex 114, in this example) has less than 2k−1 entries (three, in this example), then an entry 138 including the key address 142 having the value "1099" and the corresponding data field 144 having the value "B" is inserted in the bottom vertex 114. The entry 138 is inserted after the entry 138 including the key address 142 that has the highest value less than the key address 142 to be inserted ("1095", in this example). The remaining entries in the bottom vertex 114 are moved down, and the entry addresses 140 are adjusted accordingly, resulting in the modified bottom vertex 114' in FIG. 9. Additionally, the number of entries for the bottom vertex 114' is adjusted to three in the parent vertex 106', resulting in the sorted binary tree 900.

Figure 10:
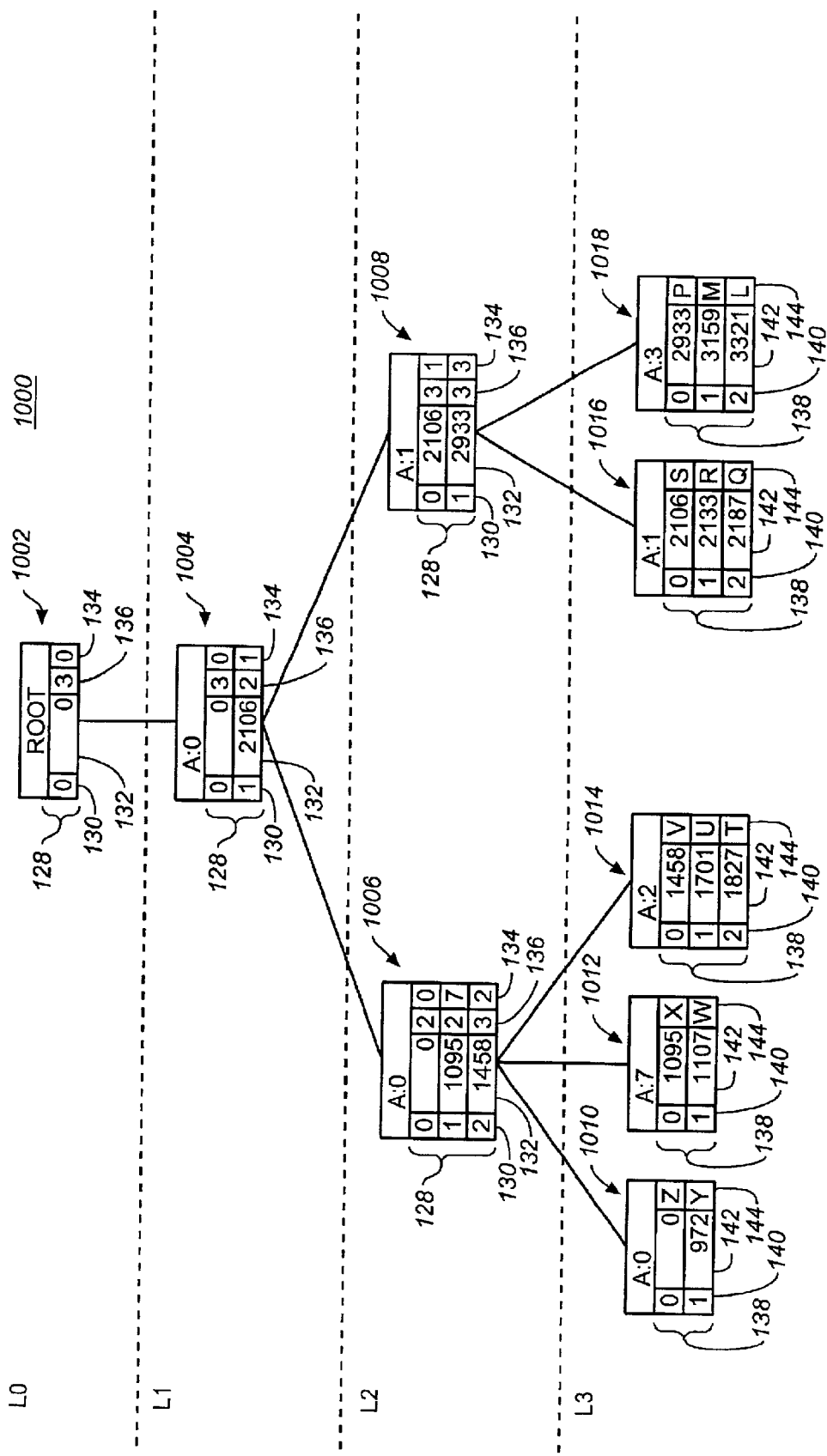
FIGS. 10 and 11 illustrate the insertion of an entry with the creation of a new bottom vertex in accordance with the present invention.
Figure 11:
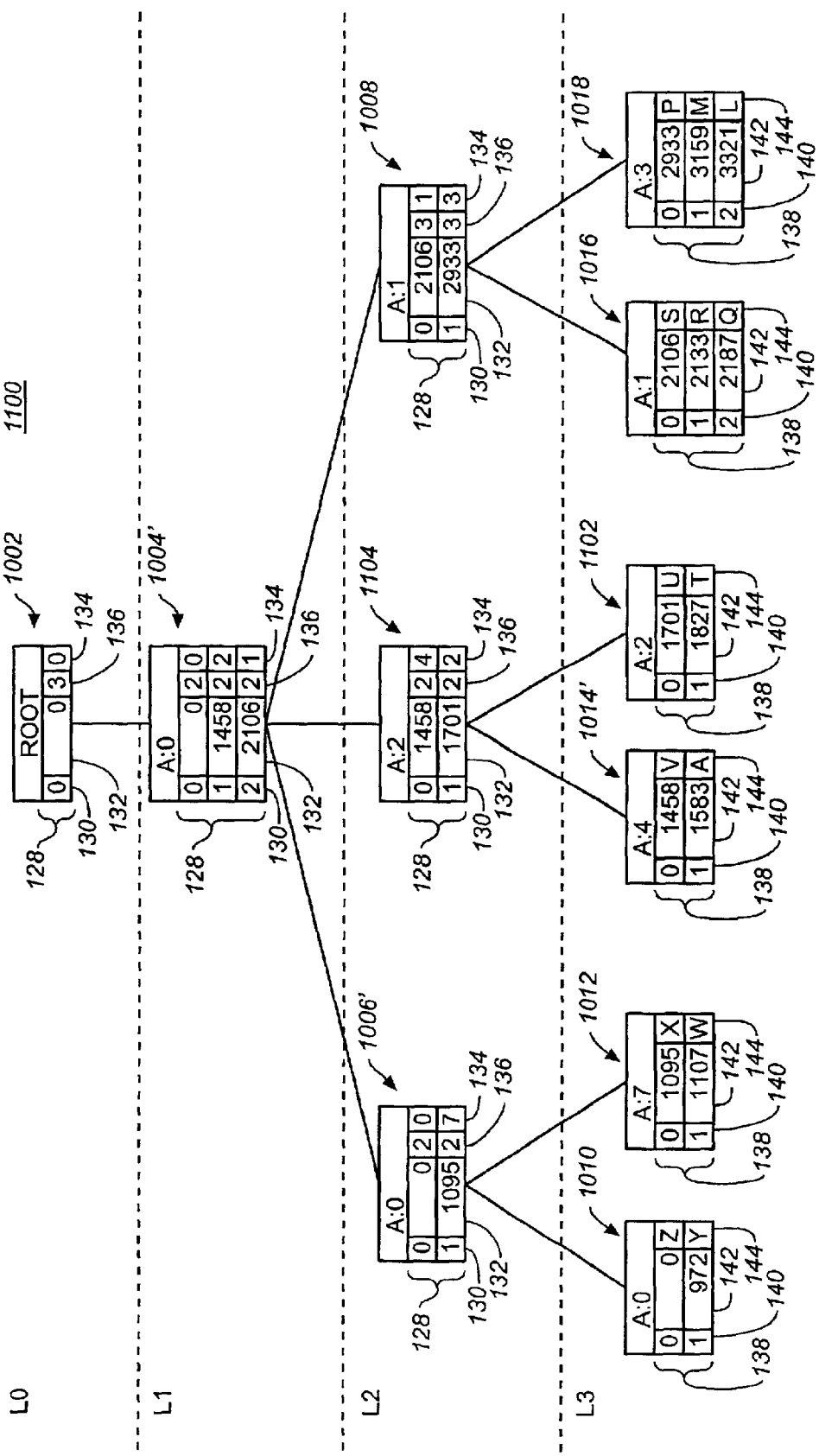

FIGS. 10 and 11 illustrate the insertion of an entry into a sorted binary tree 1000 that results in the creation of a new bottom vertex in accordance with the present invention. Shown in FIG. 10 are a root vertex 1002, hierarchy vertices 1004, 1006, and 1008, and bottom level vertices 1010, 1012, 1014, 1016, and 1018.

In this example, a new entry 138 including the key address 142 having the value "1583" and the corresponding data field 144 having the value "A" is to be inserted into the sorted binary tree 1000. The bottom vertex in which the key address "1583" would have been found is the bottom vertex 1014. However, the bottom vertex 1014 already contains the maximum of 2k−1 entries (three, in this example). To avoid the rule violation, a new bottom vertex 1102 adjacent to the bottom vertex 1014 is created as shown in FIG. 11. The new entry 138 is inserted into the bottom vertex 1014' after the entry 138 corresponding to the key address 142 that has the highest value less than the key address of the new entry ("1458", in this example). The remaining entries 138 are transferred from the bottom of the bottom vertex 1014' to the top of the new bottom vertex 1102, thus splitting the entries 138 in the bottom vertex 1014 between the bottom vertex 1014' and the new bottom vertex 1102. An attempt to insert a new entry for the new bottom vertex 1102 into the parent hierarchy vertex 1006 would raise the number of entries in the parent hierarchy vertex 1006 from three to four, which would violate the rule limiting the number of entries to 2k−1. To avoid the rule violation, a new parent hierarchy vertex 1104 is created adjacent to the parent hierarchy vertex 1006 containing the entries 128 for the bottom vertex 1014' and the bottom vertex 1102, thus splitting the hierarchy vertex 1006. The parent hierarchy vertex 1006' is adjusted to remove the entry 128 including the key address 132 having the value "1458", and the entry 128 for the new parent hierarchy vertex 1104 including the key address 132 having the value "1458" is inserted in the parent hierarchy vertex 1004' as shown to result in the sorted binary tree 1100.

Figure 12:
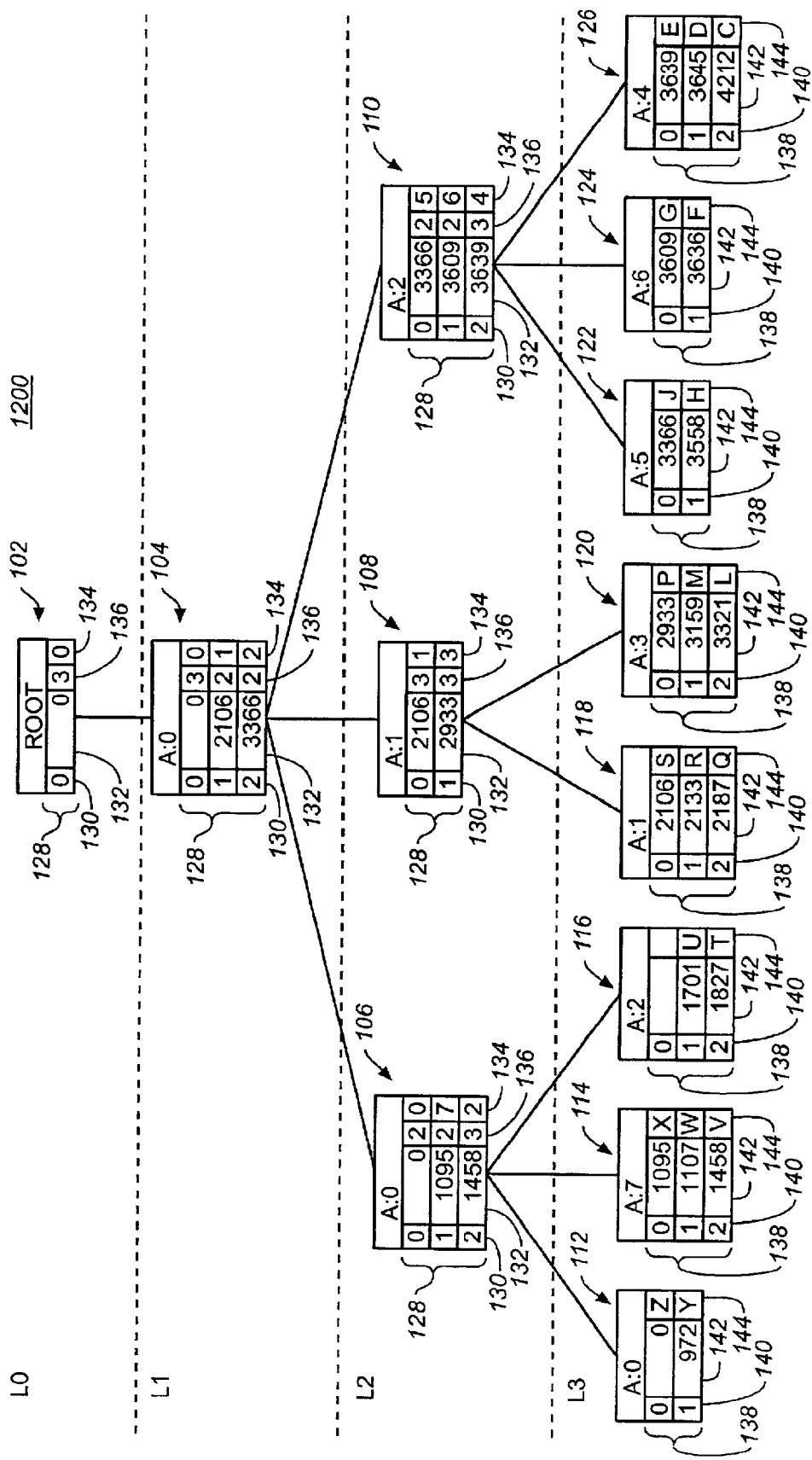
FIGS. 12 and 13 illustrate the insertion of an entry into the sorted binary tree 100 of FIG. 1 in accordance with the present invention.
Figure 13:
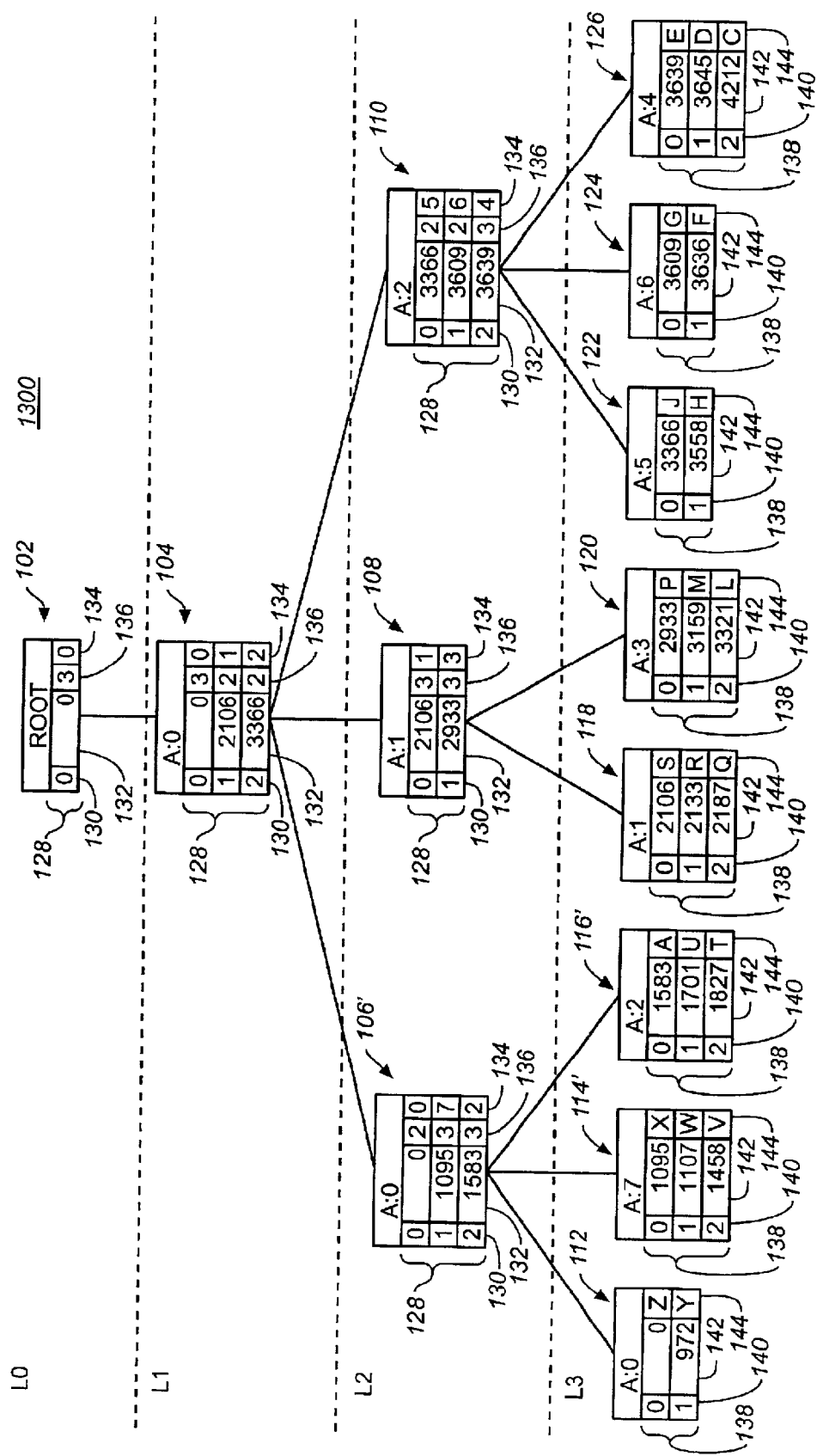

FIGS. 12 and 13 illustrate the insertion of an entry into the sorted binary tree 100 of FIG. 1 in accordance with the present invention. In this example, a new entry including the key address "1583" and corresponding data "A" is inserted into the sorted binary tree 100 to result in the sorted binary tree 1200. If the method of splitting a vertex illustrated above with respect to FIGS. 10 and 11 were used in this example, then the result would be a violation of the rule that the root vertex contain a single entry and that only one vertex may appear in the vertex level L1. Specifically, if an entry including the key address 142 having the value "1583" were inserted into the bottom vertex 116 in FIG. 1, and if the bottom vertex 116 were split as described above with respect to FIGS. 10 and 11, then the hierarchy vertex 106 would have to be split, and the vertex level L2 would contain four hierarchy vertices. Consequently, the parent hierarchy vertex 104 would require four entries, which would violate the rule limiting the number of entries to no more than 2k−1 (assuming k=2). A new hierarchy vertex may not be created adjacent to the parent hierarchy vertex 104, because the root vertex 102 would require two entries, which would violate the rule that requires that the root vertex contain a single entry.

To avoid the rule violation, the entry 138 including the key address 142 having the value "1458" is transferred from the bottom vertex 116 to the bottom of the bottom vertex 114 as shown in FIG. 12. The modification is shown in the bottom vertex 116' and the bottom vertex 114' in FIG. 13. The new entry 138 including the key address 142 having the value "1583" is inserted into the bottom vertex 116', and the entries are modified in the hierarchy vertex 106' to result in the sorted binary tree 1300 in FIG. 13.

If the bottom vertices 112 and 114 already contained the maximum allowable number of 2k−1 entries, then a new entry inserted into the bottom vertex 116 could generate a series of transfers of entries including the key addresses 142 having the highest values into the bottom vertices to the right of the bottom vertex 116 until a bottom vertex is found having fewer than 2k−1 entries. If no bottom vertex is found having fewer than 2k−1 entries, then the procedure is repeated in the previous vertex level (L2, in this example) until a hierarchical vertex is found having less than 2k−1 entries, and so on up the sorted binary tree 100 until a hierarchical vertex is found that will permit restructuring of the sorted binary tree 100.

The insert and delete operations described above are fast, however they require almost twice the memory than is required for the search engine capacity. More complex insert and delete operations may be devised to minimize the required memory, but at the cost of increasing the search time by an order of magnitude.

An important feature of the present invention is the capability of selecting the tradeoff between the required amount of memory and the edit time depending on the available memory resources and traffic conditions. The tradeoff between the required amount of memory and the edit time may be selected by a protocol parameter P.

In one aspect of the present invention, a method of changing a number of entries in a sorted binary tree includes:

selecting a protocol parameter P for determining a tradeoff between memory utilization and required execution time wherein P is an integer greater than zero;

defining a minimum number of entries and a maximum number of entries in each vertex of the sorted binary tree as a function of the protocol parameter P;

if inserting an entry into a bottom vertex of the sorted binary tree exceeds the maximum number of entries in the bottom vertex, and if another bottom vertex has fewer than the maximum number of entries, then redistributing entries in the sorted binary tree until no bottom vertex has more than the maximum number of entries and no fewer than the minimum number of entries;

if inserting an entry into the bottom vertex exceeds the maximum number of entries, and if no bottom vertex has fewer than the maximum number of entries, then creating a new bottom vertex in the sorted binary tree and redistributing entries in the sorted binary tree until no bottom vertex has more than the maximum number of entries or fewer than the minimum number of entries;

if deleting an entry from the bottom vertex results in fewer than the minimum number of entries, and if another bottom vertex has more than the minimum number of entries, then redistributing entries in the sorted binary tree until no bottom vertex has fewer than the minimum number of entries and no more than the maximum number of entries; and if deleting an entry from the bottom vertex results in fewer than the minimum number of entries, and if no bottom vertex has more than the minimum number of entries, then redistributing the entries in the sorted binary tree until the bottom vertex has no entries and deleting the bottom vertex so that every remaining bottom vertex in the sorted binary tree has no fewer than the minimum number of entries and no more than the maximum number of entries.

To implement the new editing protocol for changing the number of entries in a sorted binary tree, the following rules are added to the rules described above for the sorted binary tree 100:

(1) $P \geq 1$; (1)

(2) $BH = BF*(P+1)+1$, where $BF \geq 1$; (2)

(3) $IH = IF*(P+1)+1$, where $IF \geq 2$; (3)

and (4) $TH \geq IH$; (4)

where CAP is the maximum possible number of entries at the bottom vertex level, BH is the maximum number of entries of a bottom vertex, IH is the maximum number of entries of a hierarchical vertex (excluding the root vertex and the hierarchical vertex at vertex level L1), and TH is the maximum number of entries of the hierarchical vertex at vertex level L1. The values of the parameters in formulas (1), (2), (3), and (4) are generally expressed as positive integers.

The number of vertex levels NL and the i-th level vertex capacity LC[i] depend on the values of CAP, P, BH, IH, and TH. The bottom vertex level is indicated by the index i=0, and the vertex level L1 is indicated by the index i=NL−1. All vertices except those at the vertex levels indicated by i=0 and i=NL−1 are referred to hereinafter as intermediate vertices. The bottom level vertices are referred to herein as bottom vertices.

The capacity of the vertex level i (LC[i]) is the maximum possible number of vertices at the i-th level. The capacity of the top level L1 is one, that is:

$LC[NL-1]=1$ (5)

which means that there is only one vertex at the top level.

The number of levels and the capacity of each level LC[i] may be determined from the following procedure:

```
tek_cap = CAP;                                    (6)
for (i = 0; tek_cap > TH; i++)
{
    if (i == 0) fact = BF; else fact = IF;
    min_h = fact * P + 1;
    LC[i] = tek_cap / min_h;
    if (tek_cap % min_h > 0 ) LC[i]++;
    tek_cap = LC[i];
}
LC[i] = 1; NL = i + 1;
```

Every intermediate vertex has at least IF*P+1 entries, with the possible exception of one intermediate vertex. Every bottom vertex has at least BF*P+1 entries, with the possible exception of one bottom vertex. This means that a normal bottom vertex has a number of entries in the interval $[BF*P+1, BF*(P+1)+1]$ (7)

and a normal intermediate vertex has a number of entries in the interval $[IF*P+1, IF*(P+1)+1]$ (8)

As may be appreciated from the entry ranges expressed by the intervals (7) and (8), increasing the value of P increases memory utilization.

The following variables are defined to be used in functions for editing operations:

V is a vertex;

V.child[i] is the i-th child vertex of the vertex V;

V.num is the number of entries in the vertex V; and

V.key[i] is the first key address of the i-th child vertex of the vertex V.

A function Ind(V,E) may be defined that returns the location of the entry that includes the key address having the highest value less than that of a search key E in the vertex V as follows:

for(i=1; i<V.num; i++) if(E<V.key[i]) return (i−1); (9)

A function Split(V,i,k) may be defined that creates a new child vertex of the vertex V and splits the entries in the vertex V between the child vertex V.child[i] and the new child vertex as described above with respect to FIGS. 10 and 11. The first k entries are left in the vertex V, while the remaining V.child[i].num−k entries are transferred to the new child vertex.

A function Merge(V,i) may be defined that merges the child vertices V.child[i] and V.child[i+1] into a single vertex having V.child[i].num+V.child[i+1].num entries as described above with respect to FIG. 6.

A function Move_Up(V,i,k) may be defined that moves the upper k entries of the vertex V.child[i] to the vertex V.child[i+1] as described above with respect to FIG. 7.

A function Move_Down(V,i,k) may be defined that moves the lower k entries of the vertex V.child[i+1] to the vertex V.child[i] as described above with respect to FIG. 5.

The following functions, Up_Leveling(V) and Down_Leveling(V), are basic to the functions for inserting and deleting entries to the sorted binary tree.

The Up_Leveling(V) function redistributes entries to reduce the number of entries in the vertex V to a number of entries within the range given by the interval (7). The Up_Leveling(V) function is used when one and only one of the child vertices V.child[i] has BF*(P+1)+2 entries and may increase the number of child vertices.

In the case where the k-th child vertex of the vertex V, that is, V.child[k], has at most BF*(P+1) entries, the Up_Leveling(V) function may be performed by the following procedure:

```
if(k > i) for(j=i; j<k; j++) Move_Up(V,j,1);        (10)
    else if(k < i) for(j=i; j>k; j--) Move_Down(V,j-1,1);
```

In the case where every child vertex V.child[ ] has at least BF*(P+1)+1 entries, if i>=P−1 and if k=i−P+1, then the total number of entries in the child vertices from V.child[k] through V.child[i] is given the following formula:

$$(BF*(P+1)+2)+(P-1)*(BF*(P+1)+1) = \qquad (11)$$
$$P*(BF*(P+1)+1) =$$
$$BF*P*(P+1)+P+1 =$$
$$(BF*P+1)*(P+1)$$

The P child vertices are distributed into (P+1) child vertices as follows:

```
Split(V,i,BF+1);                                     (12)
for(j=i; j>k; j--) Move_Up(V,j-1,BF*(j-k));
```

The following symmetrical procedure may be applied:

```
if((i<P-1) && (k=i+P-1) && (k<V·num))               (13)
{
Split(V,i,BF*P+1)
for(j=i+1; j<k+1; j++) Move_Down(V,j-1, BF*
(k+1-j));
}
```

The last case is exceptional, because the vertex V has fewer than 2*P+1 entries, and the following procedure may be applied:

```
if ((i < P - 1) && (k = V.num - 1) && (k < i + P - 1))    (14)
{
Split (V, i, BF * P + 1);
for(j = i + 1; j < k + 1; j++)  Move_Down (V, j, BF * (P + i - j));
}
```

The Down_Leveling(V) function redistributes entries to increase the number of entries in the vertex V to a number of entries within the range given by the interval (7). The Down_Leveling(V) function is used when one and only one of the child vertices V.child[i] has (BF*P) entries and may decrease the number of child vertices. Without a loss of generality, the vertex V may occupy the first level. In the case where one of the child vertices V.child[k] has at least BF*P+2 entries, the following procedure may be applied:

```
if(k > i) for(j=i; j<k; j++) Move_Down(V,j,1);      (15)
    else if(k < i) for(j=i; j<k; j++) Move_Up(V,j-1,1);
```

In the case where every child vertex V.child[ ] has at most BF*(P+1)+1 entries, if i>=P1 and if k=i−P, then the total number of entries in the (P+1) child vertices from V.child[k] through V.child[i] is given the following formula:

$$(BF*P)+P*(BF*P+1) = \qquad (16)$$
$$(P+1)*BF*P+P =$$
$$P*(BF*(P+1)+1 =$$

The (P+1) child vertices are distributed into P child vertices as follows:

```
for(j=i; j>k; j--) Move_Up(V,j-1,BF*(i-j+1));       (17)
Merge(V,k);
```

The following symmetrical procedure may be applied:

```
if((i<P) && (k=i+P) && (k<V·num))                    (18)
{
for(j=i; j<k-1; j++) Move_Down(V,j,BF*
(j-i+1));
Merge(V,k-1);
}
```

The last case is exceptional, because the vertex V has fewer than 2*P+1 entries, and the following procedure may be applied:

```
if((i<P) && (k=V·num-1) && (k<i+P))                  (19)
{
for(j=i; j<k-1; j++) Move_Down(V,j,BF*
(j-i+1));
}
```

An entry E may be inserted into the sorted binary tree by computing the vertices V_0, V_1, . . . , V_{NL−1} as follows where V_{NL−1} is the level L1 vertex. The vertex V_{i−1} at the (i−1)-th level is the child of the vertex at the i-th level having the entry that includes the largest key address that is less than the entry E, that is, $$V\_\{i-1\}=V\_i.child[Ind(V,E)], i=NL-1, NL-2, \ldots, 1 \qquad (20)$$

An entry E may be inserted into a bottom vertex V_0 and the structure of the sorted binary tree may be modified if needed according to the rules described above by an editing function Bot_Ins(V_0,E) defined by:

$$for(i=1;i<NL;i++) Up\_Leveling(V\_i); \qquad (21)$$

Figure 14A:
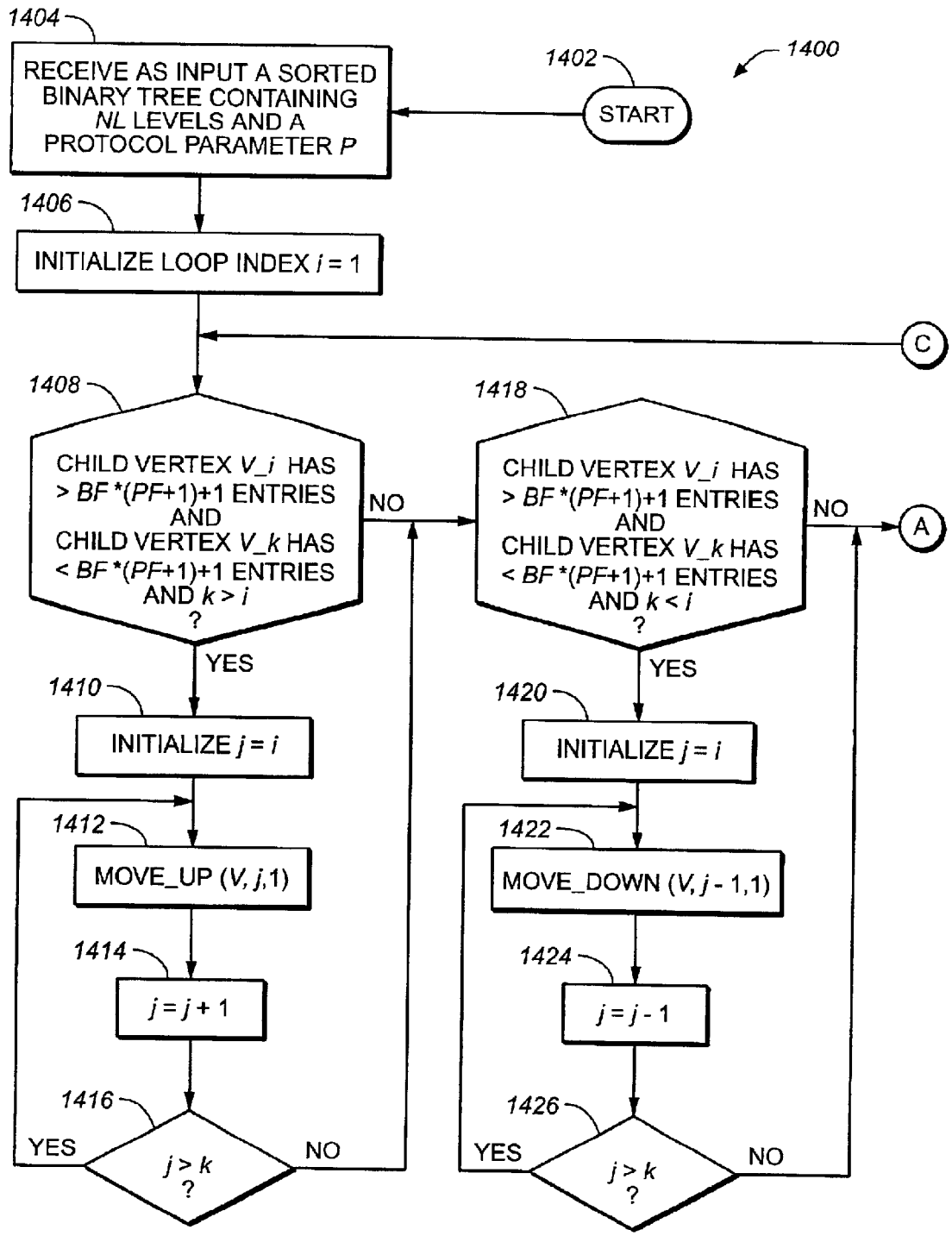
FIGS. 14A–14C illustrate a flow chart of a method of inserting an entry into a sorted binary tree using an Up_Leveling function in accordance with an embodiment of the present invention.
Figure 14B:
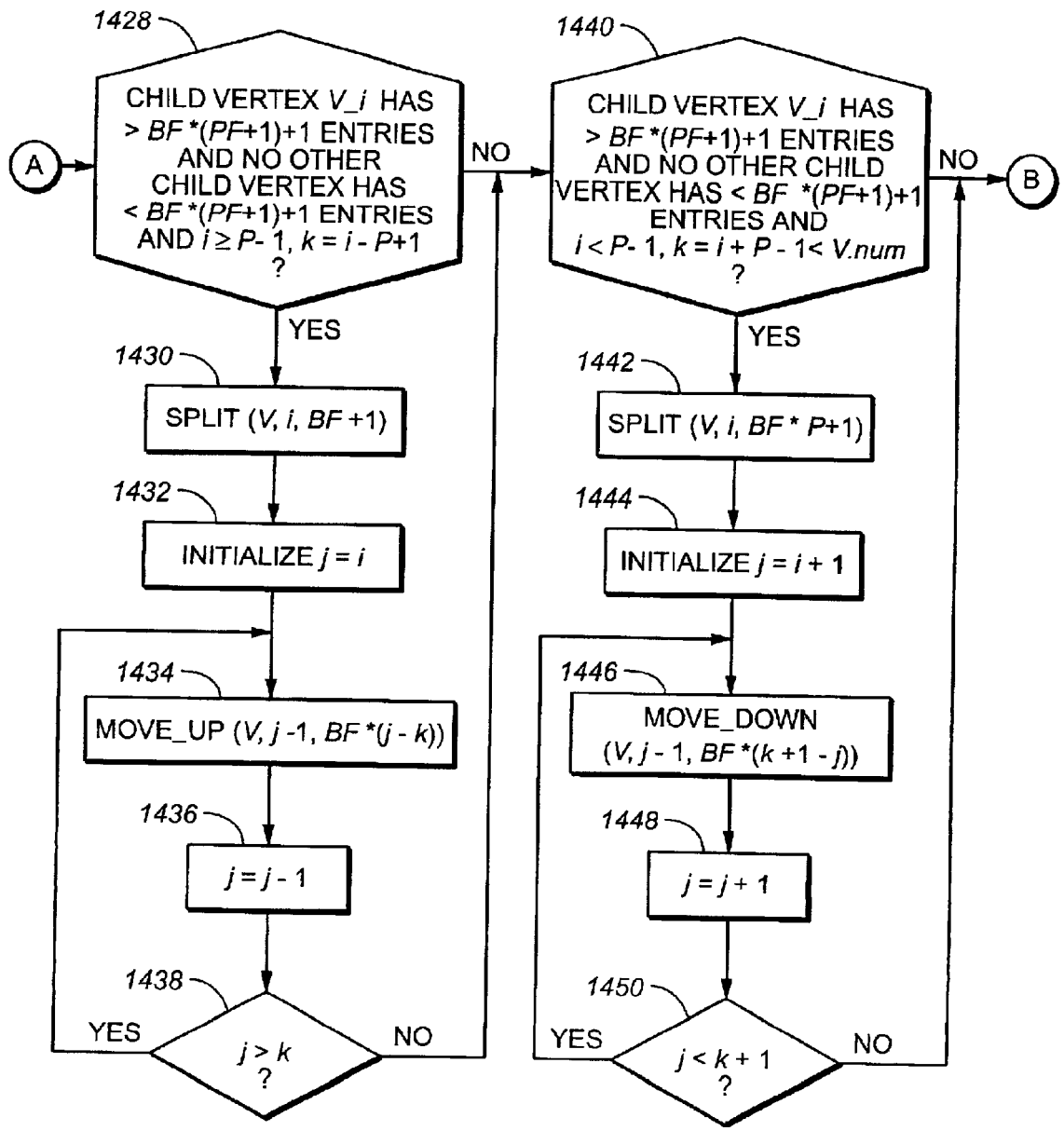
Figure 14C:
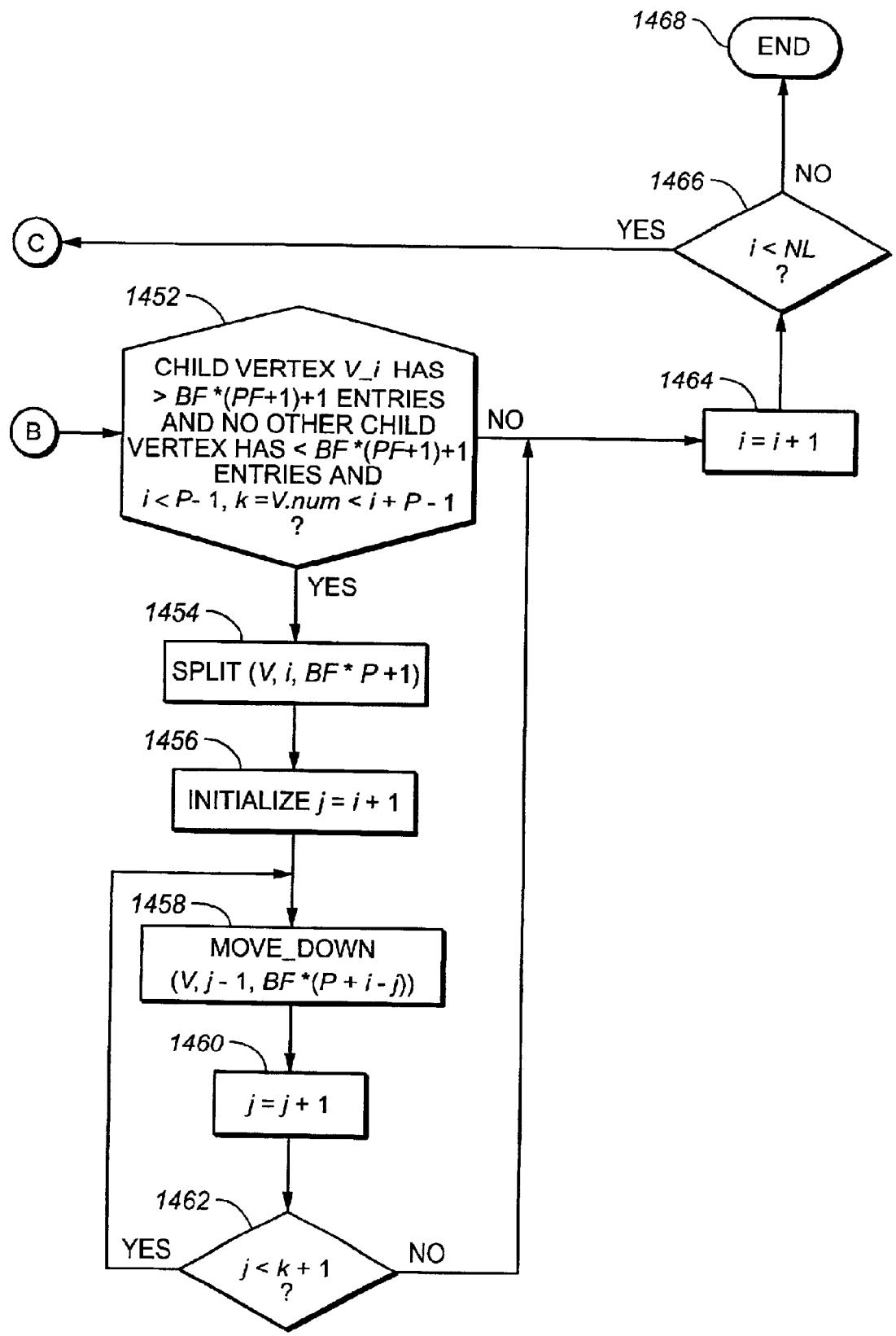

FIGS. 14A–14C illustrate a flow chart of a method of inserting an entry into a sorted binary tree using an Up_Leveling function in accordance with an embodiment of the present invention.

Step 1402 is the entry point of the flow chart 1400.

In step 1404, a sorted binary tree containing a number of levels NL and a protocol parameter P is received as input. Lower values of P will increase edit speed, while higher values of P will require less memory to insert and delete entries in the sorted binary tree.

In step 1406, a first loop index i is initialized to one.

In step 1408, if a child vertex V_i of a vertex V has more than the maximum number of entries, and if another child vertex V_k of the vertex V has at most one less than the maximum number of entries, and if k>i, then control is transferred to step 1410, otherwise control is transferred to step 1418.

In step 1410, a second loop index j is initialized to i.

In step 1412, the function Move_Up(V,j,1) is performed as described above.

In step 1414, j is incremented by one.

In step 1416, if j<k, control is transferred to step 1412, otherwise control is transferred to step 1418.

In step 1418, if the child vertex V_i has more than the maximum number of entries, and if another child vertex V_k of the vertex V has at most one less than the maximum number of entries, and if k<i, then control is transferred to step 1420, otherwise control is transferred to step 1428.

In step 1420, the second loop index j is initialized to i.

In step 1422, the function Move_Down(V,j−1,1) is performed as described above.

In step 1424, j is decremented by one.

In step 1426, if j>k, control is transferred to step 1422, otherwise control is transferred to step 1428.

In step 1428, if the child vertex V_i has more than the maximum number of entries, and if no other child vertex of the vertex V has fewer than the maximum number of entries, and if i>=P−1 and k=i−P+1, then control is transferred to step 1430, otherwise control is transferred to step 1440.

In step 1430, the function Split(V,i,BF+1) is performed as described above.

In step 1432, the second loop index j is initialized to i.

In step 1434, the function Move_Up(V,j−1,BF*(j−k)) is performed as described above.

In step 1436, j is decremented by one.

In step 1438, if j>k, control is transferred to step 1434, otherwise control is transferred to step 1440.

In step 1440, if the child vertex V_i has more than the maximum number of entries, and if no other child vertex of the vertex V has fewer than the maximum number of entries, and if i<P−1 and k=i+P−1<V.num, then control is transferred to step 1442, otherwise control is transferred to step 1452.

In step 1442, the function Split(V,i,BF*P+1) is performed as described above.

In step 1444, the second loop index j is initialized to i+1.

In step 1446, the function Move_Down(V,j−1,BF*(k+1−j)) is performed as described above.

In step 1448, j is incremented by one.

In step 1450, if j<k+1, then control is transferred to step 1446, otherwise control is transferred tp step 1452.

In step 1452, if the child vertex V_i has more than the maximum number of entries, and if no other child vertex of the vertex V has fewer than the maximum number of entries, and if i<P−1 and k=V.num−1<i+P−1, then control is transferred to step 1454, otherwise control is transferred to step 1464.

In step 1454, the function Split(V,i,BF*P+1) is performed as described above.

In step 1456, the second loop index j is initialized to i+1.

In step 1458, the function Move_Down(V,j,BF*(P+i−j)); is performed as described above.

In step 1460, j is incremented by one.

In step 1462, if j<k+1, then control is transferred to step 1458, otherwise control is transferred to step 1464.

In step 1464, i is incremented by one.

In step 1466, if i<NL, control is transferred to step 1408, otherwise control is transferred to step 1468.

Step 1468 is the exit point of the flow chart 1400.

An entry E may be deleted from a bottom vertex V_0 according to the rules of the sorted binary tree described above by an editing function Bot_Del(V_0,E) defined by:

$$\text{for}(i=1; i<NL; i++) \; \text{Down\_Leveling}(V\_i); \quad (22)$$

Figure 15A:
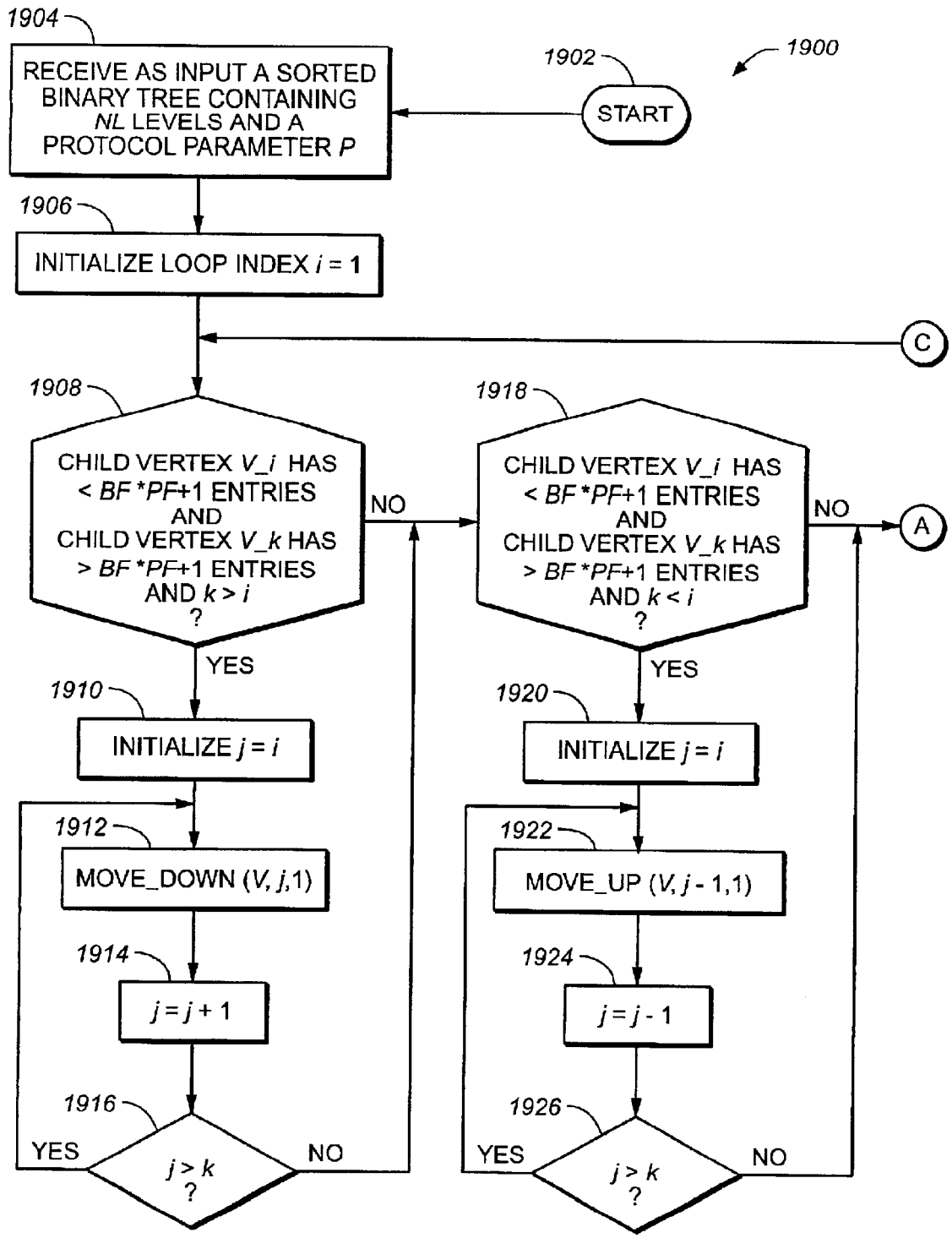
FIGS. 15A–15C illustrate a flow chart of a method of deleting an entry from a sorted binary tree using an Down_Leveling function in accordance with an embodiment of the present invention.
Figure 15B:
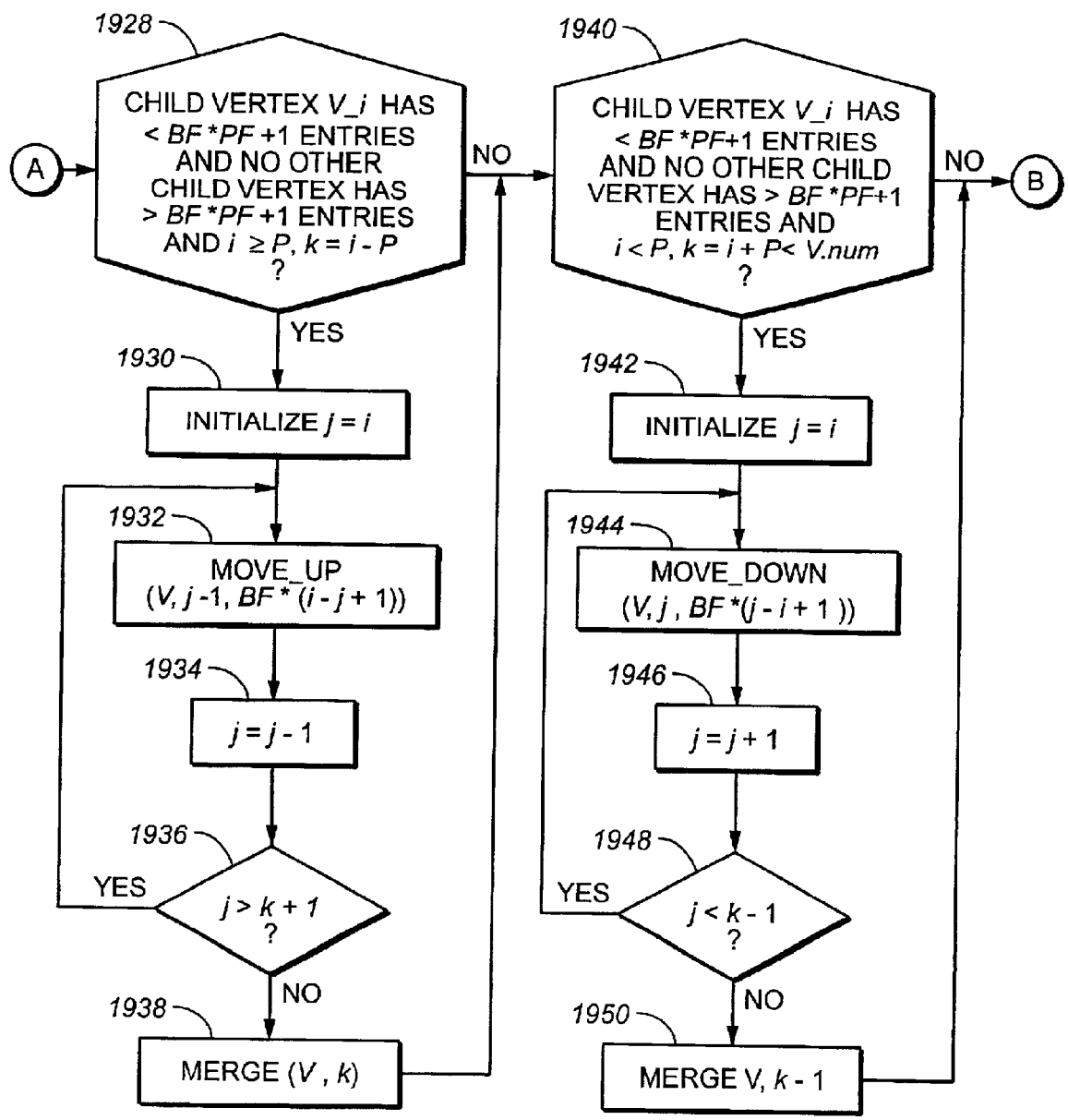
Figure 15C:
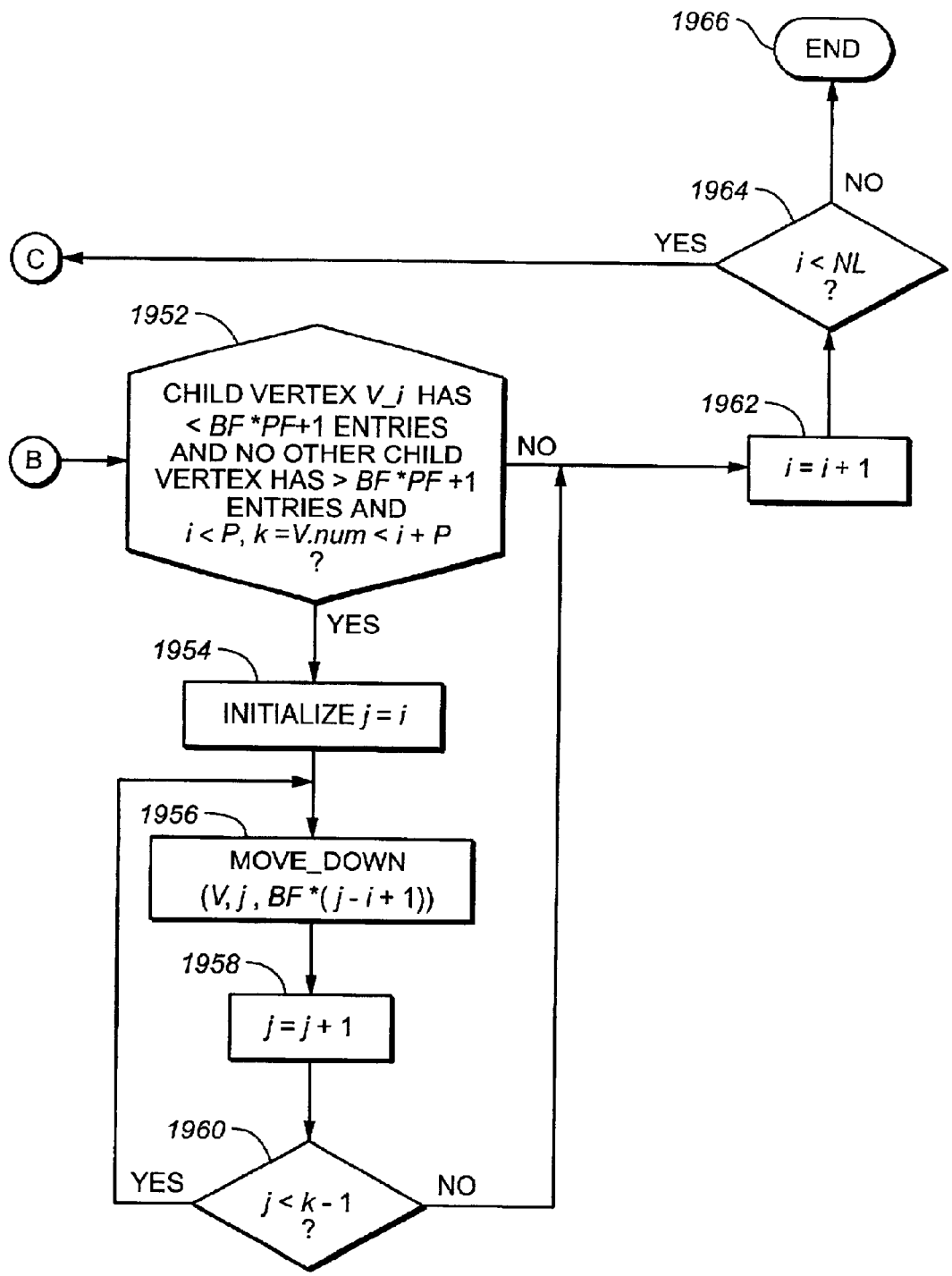

FIGS. 15A–15C illustrate a flow chart 1900 of a method of deleting an entry from a sorted binary tree using an Down_Leveling function in accordance with an embodiment of the present invention.

Step 1502 is the entry point of the flow chart 1900.

In step 1904, a sorted binary tree containing a number of levels NL and a protocol parameter P is received as input. Lower values of P will increase edit speed, while higher values of P will require less memory to insert and delete entries in the sorted binary tree.

In step 1906, a first loop index i is initialized to one.

In step 1908, if a child vertex V_i of a vertex V has fewer than the minimum number of entries, and if another child vertex V_k of the vertex V has at least one more than the minimum number of entries, and if k>i, then control is transferred to step 1910, otherwise control is transferred to step 1918.

In step 1910, a second loop index j is initialized to i.

In step 1912, the function Move_Down(V,j,1) is performed as described above.

In step 1914, j is incremented by one.

In step 1916, if j<k, control is transferred to step 1912, otherwise control is transferred to step 1918.

In step 1918, if the child vertex V_i has fewer than the minimum number of entries, and if another child vertex V_k of vertex V has at least one more than the minimum number of entries, and if k<i, then control is transferred to step 1920, otherwise control is transferred to step 1928.

In step 1920, the second loop index j is initialized to i.

In step 1922, the function Move_Up(V,j−1,1)is performed as described above.

In step 1924, j is decremented by one.

In step 1926, if j>k, control is transferred to step 1922, otherwise control is transferred to step 1928.

In step 1928, if the child vertex V_i has fewer than the minimum number of entries, and if no other child vertex of the vertex V has more than the minimum number of entries, and if i>=P and k=i−P, then control is transferred to step 1930, otherwise control is transferred to step 1940.

In step 1930, the second loop index j is initialized to i.

In step 1932, the function Move_Up(V,j−1,BF*(i−j+1)) is performed as described above.

In step 1934, j is decremented by one.

In step 1936, if j>k+1, then control is transferred to step 1932, otherwise control is transferred to step 1938.

In step 1938, the function Merge(V,k) is performed as described above.

In step 1940, if the child vertex V_i has fewer than the minimum number of entries, and if no other child vertex of the vertex V has more than the minimum number of entries, and if i<P and k=i+P<V.num, then control is transferred to step 1942, otherwise control is transferred to step 1952.

In step 1942, the second loop index j is initialized to i.

In step 1944, the function Move_Down(V,j,BF*(j−i+1)) is performed as described above.

In step 1946, j is incremented by one.

In step 1948, if j<k−1, then control is transferred to step 1944, otherwise control is transferred to step 1950.

In step 1950, the function Merge(V,k−1) is performed as described above.

In step 1952, if the child vertex V_i has fewer than the minimum number of entries, and if no other child vertex of the vertex V has more than the minimum number of entries, and if i<P and k=V.num−1<i+P, then control is transferred to step 1954, otherwise control is transferred to step 1962.

In step 1954, the second loop index j is initialized to i.

In step 1956, the function Move_Down(V,j,BF*(j−i+1)) is performed as described above.

In step 1958, j is incremented by one.

In step 1960, if j<k−1, then control is transferred to step 1956, otherwise control is transferred to step 1962.

In step 1962, i is incremented by one. In step 1964, if i<NL, then control is transferred to step 1908, otherwise control is transferred to step 1966.

Step 1966 is the exit point of the flow chart 1900.

In another aspect of the present invention, a computer program product for changing a number of entries in a sorted binary tree includes a medium for embodying a computer program for input to a computer; and a computer program embodied in the medium for causing the computer to perform the following functions:

selecting a protocol parameter P for determining a tradeoff between memory utilization and required execution time wherein P is an integer greater than zero;

defining a minimum number of entries and a maximum number of entries in each vertex of the sorted binary tree as a function of the protocol parameter P;

if inserting an entry into a bottom vertex of the sorted binary tree exceeds the maximum number of entries, and if another bottom vertex has fewer than the maximum number of entries, then redistributing entries in the sorted binary tree until no bottom vertex has more than the maximum number of entries and no fewer than the minimum number of entries;

if inserting an entry into the bottom vertex exceeds the maximum number of entries, and if no bottom vertex has fewer than the maximum number of entries, then creating a new bottom vertex in the sorted binary tree and redistributing entries in the sorted binary tree until no bottom vertex has more than the maximum number of entries or fewer than the minimum number of entries;

if deleting an entry from the bottom vertex results in fewer than the minimum number of entries, and if another bottom vertex has more than the minimum number of entries, then redistributing entries in the sorted binary tree until no bottom vertex has fewer than the minimum number of entries and no more than the maximum number of entries; and if deleting an entry from the bottom vertex results in fewer than the minimum number of entries, and if no bottom vertex has more than the minimum number of entries, then redistributing the entries in the sorted binary tree until the bottom vertex has no entries and deleting the bottom vertex so that every remaining bottom vertex in the sorted binary tree has no fewer than the minimum number of entries and no more than the maximum number of entries.

The insertion function illustrated by the flow chart 1400 of FIGS. 14–18 may be embodied in a computer program product and implemented by instructions for a computer according to well known programming techniques to perform the following functions:

(a) receiving as input a sorted binary tree containing a number of levels NL and a protocol parameter P;

(b) initializing a first loop index i to one;

(c) if a child vertex $V\_i$ of the vertex V has more than the maximum number of entries, and if another child vertex $V\_k$ of the vertex V has at most one less than the maximum number of entries, and if k>i, then transferring control to (d), otherwise transferring control to (h);

(d) initializing a second loop index j is initialized to i;

(e) performing the function Move_Up(V,j,1);

(f) incrementing j by one;

(g) if j<k, transferring control to (e), otherwise transferring control to (h);

(h) if the child vertex $V\_i$ has more than the maximum number of entries, and if another child vertex $V\_k$ of the vertex V has at most one less than the maximum number of entries, and if k<i, then transferring control to (i), otherwise transferring control to (m);

(i) initializing the second loop index j to i;

(j) performing the function Move_Down(V,j−1,1);

(k) decrementing j by one;

(l) if j>k, transferring control to (j), otherwise transferring control to (m);

(m) if the child vertex $V\_i$ has more than the maximum number of entries, and if no other child vertex of the vertex V has fewer than the maximum number of entries, and if i>=P−1 and k=i−P+1, then transferring control to (n), otherwise transferring control to (s);

(n) performing the function Split(V,i,BF+1);

(o) initializing the second loop index j to i;

(p) performing the function Move_Up(V,j−1,BF*(j−k));

(q) decrementing j by one;

(r) if j>k, transferring control to (p), otherwise transferring control to (s);

(s) if the child vertex $V\_i$ has more than the maximum number of entries, and if no other child vertex of the vertex V has fewer than the maximum number of entries, and if i<P−1 and k=i+P−1<V.num, then transferring control to (t), otherwise transferring control to (y);

(t) performing the function Split(V,i,BF*P+1);

(u) initializing the second loop index j to i+1;

(v) performing the function Move_Down(V,j−1,BF*(k+1−j));

(w) incrementing j by one;

(x) if j<k+1, then transferring control to (v), otherwise transferring control to (y);

(y) if the child vertex $V\_i$ has more than the maximum number of entries, and if no other child vertex of the vertex V has fewer than the maximum number of entries, and if i<P−1 and k=V.num−1<i+P−1, then transferring control to (z), otherwise transferring control to (ee);

(z) performing the function Split(V,i,BF*P+1);

(aa) initializing the second loop index j to i+1;

(bb) performing the function Move_Down(V,j,BF*(P+i−j));

(cc) incrementing j by one;

(dd) if j<k+1, then transferring control to (bb), otherwise transferring control to (ee);

(ee) incrementing i by one;

(ff) if i<NL, then transferring control to (c), otherwise transferring control to (gg); and (gg) terminating the entry insertion.

The deletion function illustrated by the flow chart 1900 of FIGS. 15A–15E may be embodied in a computer program product and implemented by instructions for a computer according to well known programming techniques to perform the following functions:

(a) receiving as input a sorted binary tree containing a number of levels NL and a protocol parameter P;

(b) initializing a first loop index i to one;

(c) if a child vertex $V\_i$ of a vertex V has fewer than the minimum number of entries, and if another child vertex $V\_k$ of the vertex V has at least one more than the minimum number of entries, and if k>i, then transferring control to (d), otherwise transferring control to (h);

(d) initializing a second loop index j is initialized to i;

(e) performing the function Move_Down(V,j,1);

(f) incrementing j by one;

(g) if j<k, transferring control to (e), otherwise transferring control to (h);

(h) if the child vertex $V\_i$ has fewer than the minimum number of entries, and if another child vertex $V\_k$ of the vertex V has at least one more than the minimum number of entries, and if k<i, then transferring control to (i), otherwise transferring control to (m);

(i) initializing the second loop index j to i;

(j) performing the function Move_Up(V,j−1,1);

(k) decrementing j by one;

(l) if j>k, transferring control to (j), otherwise transferring control to (m);

(m) if the child vertex $V\_i$ has fewer than the minimum number of entries, and if no other child vertex of the vertex V has more than the minimum number of entries, and if i>=P and k=i−P, then transferring control to (n), otherwise transferring control to (s);

(n) initializing the second loop index j to i;

(o) performing the function Move_Up(V,j−1,BF*(i−j+1));

(p) decrementing j by one;

(q) if j>k+1, then transferring control to (o), otherwise transferring control to (r);

(r) performing the function Merge(V,k);

(s) if the child vertex $V\_i$ has fewer than the minimum number of entries, and if no other child vertex of the vertex V has more than the minimum number of entries, and if i<P and k=i+P<V.num, then transferring control to (t), otherwise transferring control to (y);

(t) initializing the second loop index j to i;

(u) performing the function Move_Down(V,j,BF*(j−i+1));

(v) incrementing j by one;

(w) if j<k−1, then transferring control to (u), otherwise transferring control to (x);

(x) performing the function Merge(V,k−1);

(y) if the child vertex $V\_i$ has fewer than the minimum number of entries, and if no other child vertex of the vertex V has more than the minimum number of entries, and if i<P and k=V.num<i+P, then transferring control to (z), otherwise transferring control to (dd);

(z) initializing the second loop index j to i;

(aa) performing the function Move_Down(V,j,BF*(j−i+1));

(bb) incrementing j by one;

(cc) if j<k−1, then transferring control to (aa), otherwise transferring control to (dd);

(dd) incrementing i by one;

(ee) if i<NL, then transferring control to (c), otherwise transferring control to (ff); and (ff) terminating the entry deletion.

The editing functions Bot_Ins(V_0,E) and Bot_Del(V_0,E) may also be used with longest prefix matching by constructing prefix masks during the insertion and deletion of entries as described in U.S. patent application Ser. No. 09/679,209 for "FAST FLEXIBLE SEARCH ENGINE FOR LONGEST PREFIX MATCH".

Although the methods of the present invention illustrated above are described and shown with reference to specific steps performed in a specific order, these steps may be combined, sub-divided, or reordered without departing from the scope of the claims. Unless specifically indicated herein, the order and grouping of steps is not a limitation of the present invention.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A computer-implemented method of editing a sorted tree data structure comprising:

selecting a minimum number of entries and a maximum number of entries in each vertex of the sorted tree data structure wherein each entry includes an entry address, a key address, a child vertex address, and a child vertex index for determining a tradeoff between memory utilization and required execution time;

if inserting an entry into a bottom vertex of the sorted tree data structure exceeds the maximum number of entries in the bottom vertex, and if another bottom vertex has fewer than the maximum number of entries, then redistributing entries in the sorted tree data structure until no bottom vertex has more than the maximum number of entries and no bottom vertex has fewer than the minimum number of entries;

if inserting an entry into the bottom vertex exceeds the maximum number of entries, and if no bottom vertex has fewer than the maximum number of entries, then creating a new bottom vertex in the sorted tree data structure and redistributing entries in the sorted tree data structure until no bottom vertex has more than the maximum number of entries and no bottom vertexs has fewer than the minimum number of entries;

if deleting an entry from the bottom vertex results in fewer than the minimum number of entries, and if another bottom vertex has more than the minimum number of entries, then redistributing entries in the sorted tree data structure until no bottom vertex has fewer than the minimum number of entries and no bottom vertex has more than the maximum number of entries; and if deleting an entry from the bottom vertex results in fewer than the minimum number of entries, and if no remaining bottom vertex has more than the minimum number of entries, then redistributing the entries in the sorted tree data structure until the bottom vertex has no entries and deleting the bottom vertex so that every remaining bottom vertex in the sorted tree data structure has no fewer than the minimum number of entries and no more than the maximum number of entries.

2. The method of claim 1 wherein inserting an entry comprises:

(a) receiving as input a sorted tree data structure containing a number of levels NL;

(b) initializing a first loop index i to one;

(c) if a child vertex $V\_i$ of the vertex V has more than the maximum number of entries, and if another child vertex V_k of the vertex V has at most one less than the maximum number of entries, and if k>i, then continuing from (d), otherwise continuing from (h);

(d) initializing a second loop index j to i;

(e) moving an entry of the child vertex V_j to the child vertex V_j+1;

(f) incrementing j by one;

(g) if j<k, then continuing from (e), otherwise continuing from (h);

(h) if the child vertex V_i has more than the maximum number of entries, and if another child vertex V_k of the vertex V has at most one less than the maximum number of entries, and if k<i, then continuing from (i), otherwise continuing from (m);

(i) initializing the second loop index j to i;

(j) moving an entry of the child vertex V_j to the child vertex V_j−1;

(k) decrementing j by one;

(l) if j>k, then continuing from (j), otherwise continuing from (m);

(m) if the child vertex V_i has more than the maximum number of entries, and if no other child vertex of the vertex V has fewer than the maximum number of entries, then continuing from (n), otherwise continuing from (s);

(n) creating a new child vertex of the vertex V and transferring a number of entries from the child vertex V_i to the new child vertex;

(o) initializing the second loop index j to i;

(p) moving an entry of the child vertex V_j−1 to the child vertex V_j;

(q) decrementing j by one;

(r) if j>k, then continuing from (p), otherwise continuing from (s);

(s) if the child vertex V_i has more than the maximum number of entries, and if no other child vertex of the vertex V has fewer than the maximum number of entries, then continuing from (t), otherwise continuing from (y);

(t) creating a new child vertex of the vertex V and transferring a number of entries from the child vertex V_i to the new child vertex;

(u) initializing the second loop index j to i+1;

(v) moving an entry of the child vertex V_j to the child vertex V_j−1;

(w) incrementing j by one;

(x) if j<k+1, then continuing from (v), otherwise continuing from (y);

(y) if the child vertex V_i has more than the maximum number of entries, and if no other child vertex of the vertex V has fewer than the maximum number of entries, then continuing from (z), otherwise continuing from (ee);

(z) creating a new child vertex of the vertex V and transferring a number of entries from the child vertex V_i to the new child vertex;

(aa) initializing the second loop index j to i+1;

(bb) moving an entry of the child vertex V_j+1 to the child vertex V_j;

(cc) incrementing j by one;

(dd) if j<k+1, then continuing from (bb), otherwise continuing from (ee);

(ee) incrementing i by one;

(ff) if i<NL, then continuing from (c), otherwise continuing from (gg); and (gg) terminating the entry insertion.

3. The method of claim 1 wherein deleting an entry comprises:

(a) receiving as input a sorted tree data structure containing a number of levels NL;

(b) initializing a first loop index i to one;

(c) if a child vertex V_i of a vertex V has fewer than the minimum number of entries, and if another child vertex V_k of the vertex V has at least one more than the minimum number of entries, and if k>i, then continuing from (d), otherwise continuing from (h);

(d) initializing a second loop index j to i;

(e) moving an entry of the child vertex V_j+1 to the child vertex V_j;

(f) incrementing j by one;

(g) if j<k, then continuing from (e), otherwise continuing from (h);

(h) if the child vertex V_i has fewer than the minimum number of entries, and if another child vertex V_k of the vertex V has at least one more than the minimum number of entries, and if k<i, then continuing from (i), otherwise continuing from (m);

(i) initializing the second loop index j to i;

(j) moving an entry of the child vertex V_j−1 to the child vertex V_j;

(k) decrementing j by one;

(l) if j>k, continuing from (j), otherwise continuing from (m);

(m) if the child vertex V_i has fewer than the minimum number of entries, and if no other child vertex of the vertex V has more than the minimum number of entries, then continuing from (n), otherwise continuing from (s);

(n) initializing the second loop index j to i;

(o) moving an entry of the child vertex V_j−1 to the child vertex V_j;

(p) decrementing j by one;

(q) if j>k+1, then continuing from (o), otherwise continuing from (r);

(r) merging the k-th and (K+1)-th child vertices of the vertex V into a single vertex;

(s) if the child vertex V_i has fewer than the minimum number of entries, and if no other child vertex of the vertex V has more than the minimum number of entries, then continuing from (t), otherwise continuing from (y);

(t) initializing the second loop index j to i;

(u) moving an entry of the child vertex V_j+1 to the child vertex V_j;

(v) incrementing j by one;

(w) if j<k−1, then continuing from (u), otherwise continuing from (x);

(x) merging the (k−1)-th and k-th child vertices of the vertex V into a single vertex;

(y) if the child vertex V_i has fewer than the minimum number of entries, and if no other child vertex of the vertex V has more than the minimum number of entries, then continuing from (z), otherwise continuing from (dd);

(z) initializing the second loop index j to i;
(aa) moving an entry of the child vertex V_j+1 to the child vertex V_j;
(bb) incrementing j by one;
(cc) if j<k−1, then continuing from (aa), otherwise transferring control to (dd);
(dd) incrementing i by one;
(ee) if i<NL, then continuing from (c), otherwise continuing from (ff); and
(ff) terminating the entry deletion.

4. A computer program product for editing a sorted tree data structure comprising:

a medium for embodying a computer program for input to a computer; and a computer program embodied in the medium for causing the computer to perform the following functions:

selecting a minimum number of entries and a maximum number of entries in each vertex of the sorted tree data structure wherein each entry includes an entry address, a key address, a child vertex address, and a child vertex index for determining a tradeoff between memory utilization and required execution time;

if inserting an entry into a bottom vertex of the sorted tree data structure exceeds the maximum number of entries, and if another bottom vertex has fewer than the maximum number of entries, then redistributing entries in the sorted tree data structure until no bottom vertex has more than the maximum number of entries and no bottom vertex has fewer than the minimum number of entries;

if inserting an entry into the bottom vertex exceeds the maximum number of entries, and if no bottom vertex has fewer than the maximum number of entries, then creating a new bottom vertex in the sorted tree data structure and redistributing entries in the sorted tree data structure until no bottom vertex has more than the maximum number of entries and no bottom vertex has fewer than the minimum number of entries;

if deleting an entry from the bottom vertex results in fewer than the minimum number of entries, and if another bottom vertex has more than the minimum number of entries, then redistributing entries in the sorted tree data structure until no bottom vertex has fewer than the minimum number of entries and no bottom vertex has more than the maximum number of entries; and if deleting an entry from the bottom vertex results in fewer than the minimum number of entries, and if no bottom vertex has more than the minimum number of entries, then redistributing the entries in the sorted tree data structure so that the bottom vertex has no entries and deleting the bottom vertex so that every remaining bottom vertex in the sorted tree data structure has no fewer than the minimun number of entries and no bottom verted has more than the minimum number of entries.

5. The computer program product of claim 4 wherein inserting an entry comprises:

(a) receiving as input a sorted tree data structure containing a number of levels NL;
(b) initializing a first loop index i to one;
(c) if a child vertex V_i of the vertex V has more than the maximum number of entries, and if another child vertex V_k of the vertex V has at most one less than the maximum number of entries, and if k>i, then continuing from (d), otherwise continuing from (h);
(d) initializing a second loop index j to i;
(e) moving an entry of the child vertex V_j to the child vertex V_j+1;
(f) incrementing j by one;
(g) if j<k, continuing from (e), otherwise continuing from (h);
(h) if the child vertex V_i has more than the maximum number of entries, and if another child vertex V_k of the vertex V has at most one less than the maximum number of entries, and if k<i, then continuing from (i), otherwise continuing from (m);
(i) initializing the second loop index j to i;
(j) moving an entry of the child vertex V_j to the child vertex V_j−1;
(k) decrementing j by one;
(l) if j>k, continuing from control to (j), otherwise continuing from (m);
(m) if the child vertex V_i has more than the maximum number of entries, and if no other child vertex of the vertex V has fewer than the maximum number of entries, then continuing from (n), otherwise continuing from control to (s);
(n) creating a new child vertex of the vertex V and transferring a number of entries from the child vertex V_i to the new child vertex;
(o) initializing the second loop index j to i;
(p) moving an entry of the child vertex V_j−1 to the child vertex V_j;
(q) decrementing j by one;
(r) if j>k, then continuing from (p), otherwise continuing from (s);
(s) if the child vertex V_i has more than the maximum number of entries, and if no other child vertex of the vertex V has fewer than the maximum number of entries, then continuing from (t), otherwise continuing from (y);
(t) creating a new child vertex of the vertex V and continuing from a number of entries from the child vertex V_i to the new child vertex;
(u) initializing the second loop index j to i+1;
(v) moving an entry of the child vertex V_j to the child vertex V_j−1;
(w) incrementing j by one;
(x) if j<k+1, then continuing from (v), otherwise continuing from (y);
(y) if the child vertex V_i has more than the maximum number of entries, and if no other child vertex of the vertex V has fewer than the maximum number of entries, then continuing from (z), otherwise continuing from (ee);
(z) creating a new child vertex of the vertex V and transferring a number of entries from the child vertex V_i to the new child vertex;
(aa) initializing the second loop index j to i+1;
(bb) moving an entry of the child vertex V_j+1 to the child vertex V_j;
(cc) incrementing j by one;
(dd) if j<k+1, then continuing from (bb), otherwise transferring control to (ee);
(ee) incrementing i by one;
(ff) if i<NL, then continuing from (c), otherwise transferring control to (gg); and
(gg) terminating the entry insertion.

6. The computer program product of claim 4 wherein deleting an entry comprises:

(a) receiving as input a sorted tree data structure containing a number of levels NL;

(b) initializing a first loop index i to one;

(c) if a child vertex V_i of a vertex V has fewer than the minimum number of entries, and if another child vertex V_k of the vertex V has at least one more than the minimum number of entries, and if k>i, then continuing from (d), otherwise continuing from (h);

(d) initializing a second loop index j to i;

(e) moving an entry of the child vertex V_j+1 to the child vertex V_j;

(f) incrementing j by one;

(g) if j<k, then continuing from (e), otherwise continuing from (h);

(h) if the child vertex V_i has fewer than the minimum number of entries, and if another child vertex V_k of the vertex V has at least one more than the minimum number of entries, and if k<i, then continuing from (i), otherwise continuing from (m);

(i) initializing the second loop index j to i;

(j) moving an entry of the child vertex V_j−1 to the child vertex V_j;

(k) decrementing j by one;

(l) if j>k, then continuing from (j), otherwise continuing from (m);

(m) if the child vertex V_i has fewer than the minimum number of entries, and if no other child vertex of the vertex V has more than the minimum number of entries, then continuing from (n), otherwise continuing from (s);

(n) initializing the second loop index j to i;

(o) moving an entry of the child vertex V_j−1 to the child vertex V_j;

(p) decrementing j by one;

(q) if j>k+1, then continuing from (o), otherwise continuing from (r);

(r) merging the k-th and (k+1)-th child vertices of the vertex V into a single vertex;

(s) if the child vertex V_i has fewer than the minimum number of entries, and if no other child vertex of the vertex V has more than the minimum number of entries, then continuing from (t), otherwise transferring control to (y);

(t) initializing the second loop index j to i;

(u) moving an entry of the child vertex V_j+1 to the child vertex V_j;

(v) incrementing j by one;

(w) if j<k−1, then continuing from (u), otherwise continuing from (x);

(x) merging the (k−1)-th and k-th child vertices of the vertex V into a single vertex;

(y) if the child vertex V_i has fewer than the minimum number of entries, and if no other child vertex of the vertex V has more than the minimum number of entries, then continuing from (z), otherwise continuing from (dd);

(z) initializing the second loop index j to i;

(aa) moving an entry of the child vertex V_j+1 to the child vertex V_j;

(bb) incrementing j by one;

(cc) if j<k−1, then continuing from (aa), otherwise continuing from (dd);

(dd) incrementing i by one;

(ee) if i<NL, then continuing from (c), otherwise continuing from (ff); and (ff) terminating the entry deletion.

* * * * *